United States Patent [19]
Yanai et al.

[11] Patent Number: 5,240,997
[45] Date of Patent: Aug. 31, 1993

[54] PROCESS FOR PRODUCING ETHYLENE-VINYL ALCOHOL COPOLYMERS

[75] Inventors: Hisamichi Yanai; Takanori Kitamura; Fumio Nakahara; Katsumi Shimizu; Akimasa Aoyama; Takeshi Moritani, all of Kurashiki, Japan

[73] Assignee: Kuraray Co., Ltd., Kurashiki, Japan

[21] Appl. No.: 818,111

[22] Filed: Jan. 8, 1992

[30] Foreign Application Priority Data

Jan. 18, 1991 [JP] Japan .................. 3-19415

[51] Int. Cl.$^5$ .................................. C08F 16/06
[52] U.S. Cl. ...................... 525/60; 526/210; 526/222; 526/319
[58] Field of Search ............... 525/60; 526/222, 319, 526/210

[56] References Cited

U.S. PATENT DOCUMENTS

| | | | |
|---|---|---|---|
| 2,386,347 | 10/1945 | Roland | 260/86 |
| 3,080,350 | 3/1963 | Imai et al. | 525/62 X |
| 3,344,129 | 9/1967 | Bestian et al. | 525/60 |
| 3,780,004 | 12/1973 | Hoyt et al. | 525/62 X |
| 4,134,837 | 1/1979 | Yamashita et al. | 210/500 M |
| 4,269,713 | 5/1981 | Yamashita et al. | 210/500.2 |
| 4,636,551 | 1/1987 | Okaya et al. | 525/60 |
| 4,707,516 | 11/1987 | Janouch et al. | 525/60 |

FOREIGN PATENT DOCUMENTS 0005942  1/1980  Japan ......................... 525/60

OTHER PUBLICATIONS

"POVAL" (Revised Edition) published by Kobunshi Kankokai on Apr. 1, 1981. Partial translation only.

Primary Examiner—Joseph L. Schofer
Assistant Examiner—J. M. Reddick
Attorney, Agent, or Firm—Kramer, Brufsky & Cifelli

[57] ABSTRACT

Process for producing ethylene-vinyl ester copolymers using a polymerization solvent of a dialkyl sulfoxide (process X); process for producing ethylene-vinyl alcohol copolymer by liquid phase saponification using a solvent of a dialkyl sulfoxide (process Y); and process for producing shaped articles which comprises contacting the ethylene-vinyl alcohol copolymer obtained by the process Y, or that obtained by saponifying the ethylene-vinyl ester copolymer obtained by process X, to a non-solvent for ethylene-vinyl alcohol copolymer.

Ethylene-vinyl ester copolymers having a wide range of ethylene content and higher degree of polymerization than that with solution polymerization using methanol.

The rate of saponification is higher than that with single solvent system of lower alcohol.

Production cost is low, because production process of polymer is directly connected to that of shaped articles utilizing the polymer.

5 Claims, 7 Drawing Sheets

PROCESS FOR PRODUCING ETHYLENE-VINYL ALCOHOL COPOLYMERS

BACKGROUND OF THE INVENTION

1. Field of the invention

The present invention relates to processes for producing ethylene-vinyl ester copolymers, ethylene-vinyl alcohol copolymers and processes for producing shaped articles therefrom.

2. Description of the prior art

Ethylene-vinyl alcohol copolymers (hereinafter sometimes referred to as "EVOH") are obtained by saponifying ethylene-vinyl ester copolymers, particularly ethylene-vinyl acetate copolymer. In particular, EVOH's having an ethylene content of 25 to 45 mol % and an inherent viscosity (hereinafter referred to as "[η]inh") of 0.099 to 0.110 liter/gram (hereinafter "liter/gram" is expressed as "l/g") (measured at 30° C. using a mixed solvent consisting of water 15 wt % and phenol 85 wt %), are known and widely used, thanks to their high gas barrier properties, for food packaging containers, containers for oils, parts which contact oils and similar purposes. Demand for these copolymers is expanding to a great extent in conformity with changing eating habits.

EVOH's having an ethylene content of less than 25 mol % are expected to be more widely used as products that improve the water resistance, water absorption property and swelling property of polyvinyl alcohol. EVOH's having an ethylene content of at least 45 mol % are expected to be more widely used as EVOH resin having excellent flexibility and moldability. Further EVOH's having an ethylene content of 25 to 45 mol % and having an [η]inh exceeding 0.110 l/g are expected to be more widely used as products having improved durability and mechanical strength, which will contribute to improvements of performance in various fields of use. To summarize, EVOH's having higher or lower ethylene content than that of known EVOH's, and those having higher degree of polymerization than that of known EVOH's could exhibit various excellent performances that cannot be achieved by the known EVOH's, and development of their inexpensive and rational production process therefore has been desired.

It is known that, upon copolymerization of ethylene and vinyl ester by solution polymerization, an alcohol such as methanol or t-butanol is principally used as the polymerization solvent. No disclosure has ever been made that dimethyl sulfoxide is used as the polymerization solvent in the production of ethylene-vinyl ester copolymers. In the known process, where an alcohol such as methanol is used as polymerization solvent and the desired copolymer should have a high ethylene content of at least 50 mol %, the resulting copolymer precipitates at a temperature range of not higher than 50° C. in the reaction zone to make the solution heterogeneous even in the presence of about 20% by weight of the solvent in the zone. This causes inconvenience in operation, particularly with continuous polymerization. It is also known that, with solution polymerization, higher solvent concentration in the polymerization zone results in lower degree of polymerization of the resulting polymer. To obtain a polymer with high degree of polymerization, it is therefore necessary, where the known solvent of methanol or the like is used, to take measures that are undesirable from the standpoint of production efficiency, such as lowering the polymerization temperature, suppressing polymerization rate and suppressing the amount of methanol added. With copolymerization at a high temperature of at least 60° C., heat of reaction becomes large, and hence it becomes difficult to maintain a uniform temperature throughout the reaction zone and there may occur run away reaction particularly with radical polymerization.

On the other hand, homopolymerization of vinyl acetate in a solvent of dimethyl sulfoxide is known. See for example Japanese patent publication No. 3999/1961 (U.S. Pat. No. 3,080,350). There is, however, no description of copolymerization of ethylene and vinyl acetate, or about how dimethyl sulfoxide, upon radical copolymerization of ethylene and vinyl acetate, functions or influences the internal structure of the resulting copolymer.

Known saponification processes for ethylene-vinyl ester copolymer include a homogeneous saponification process which comprises using an alcohol solvent such as methanol and an alkaline catalyst and a heterogeneous saponification comprising using a solvent of methanol/water or the like and an alkaline catalyst. In saponification with a solvent of methanol, the rate of saponification however decreases to a large extent with increasing ethylene content.

In particular, homogeneous saponification generally proceeds as follows and is more advantageous than heterogeneous saponification from the viewpoint of commercial production. The EVOH that forms by saponification is, in the form of solution in methanol, subjected to a primary processing of extrusion into a non-solvent for the copolymer, such as water, or a mixed solvent of methanol and the non-solvent to form strands, chips or the like shapes, followed by drying thereof. The EVOH thus obtained is then, in the form of melts or a solution in a specific solvent, generally subjected to a secondary processing into fiber, hollow fiber, film, granules or like desired shapes, to give a finished product. These known processes contain, as described below, various points to improve.

1) The solubility of an ethylene-vinyl acetate copolymer in methanol decreases with increasing ethylene content, so that saponification in a homogeneous phase requires undesirable conditions such as high temperature and high pressure.

2) The EVOH that forms by saponification of an ethylene-vinyl acetate copolymer having an ethylene content lower than 25 mol % or higher than 45 mol % has poor solubility in methanol. Particularly in the low-ethylene side, a homogeneous state with a concentration sufficiently high for commercial production cannot be maintained even under high-temperature and high-pressure conditions of at least 100° C., whereby saponification in a homogeneous state cannot be conducted.

3) Saponification of ethylene-vinyl acetate copolymer proceeds slower than that of polyvinyl acetate, thereby requiring a large amount of catalyst and methanol and, also caused by the poor solubility of the resulting polymer mentioned above, severe conditions of high temperature and high pressure. As a result the production cost increases with increased raw material cost and utility cost of steam and the like and increased equipment cost for reaction vessel and the like.

Studies made so far show that ethylene-vinyl acetate copolymers having a vinyl acetate content of not more than 40 mol % are difficult to hydrolyze due to its markedly low solubility. Accordingly, Bestian (U.S.

Pat. No. 3,344,129) reports that alcoholysis of such copolymers in methanol or ethanol proceeds at a very low rate because of the markedly low solubility of the copolymer in the solvent. Then the reaction mixture contains both hydrolyzed molecules and unhydrolyzed molecules and is heterogeneous. According to Bestian, the Roland process (U.S. Pat. No. 2,386,347) that comprises using a mixture of an aromatic hydrocarbon and an alcohol as reaction solvent is effective only with the molar ratio between vinyl ester and ethylene (vinyl ester/ethylene) being greater than 1/5. With a low vinyl acetate content in the polymer, the amount of aromatic hydrocarbon required is very large, which is uneconomical, and the reaction rate is close to 0. To overcome these problems, Bestian proposes to use a reaction solvent of an alcohol having 4 to 8 carbon atoms, thereby improving solubility, and further suggests employment of higher temperature.

U.S. Pat. No. 3,080,350 of Imai et al (Japanese Patent Publication No. 4539/1961) discloses a process which comprises polymerizing vinyl acetate in an aprotic solvent having a large polarity, i.e. dimethyl sulfoxide, and subjecting the obtained polyvinyl acetate to hydrolysis or alcoholysis into polyvinyl alcohol. The patent however describes nothing about copolymerization of ethylene and vinyl acetate or alcoholysis of the resulting copolymer to obtain EVOH. The patent does not describe about what function dimethyl sulfoxide performs upon alcoholysis of ethylene-vinyl acetate copolymer or how it influences the structure of the resulting EVOH.

Vinson reports that the use of dimethyl sulfoxide as a reaction solvent leads to an increase in the rate of saponification of polyvinyl acetate (J. Chem. Ed. 46, 877 (1969). The process of saponification according to Vinson, however, proceeds in the presence of a considerably large amount of water. As a result, when this process is applied to ethylene-vinyl acetate copolymer, heterogeneous reaction results since the EVOH that forms is insoluble in water.

U.S. Pat. No. 3,780,004 by John et al (Japanese Patent Application Laid-open No. 71082/1974 discloses a process which comprises conducting saponification of ethylene-vinyl ester co-polymer in a solid phase in an aprotic reaction medium such as dimethylformamide or dimethyl sulfoxide, in combination with, as occasions demand, a hydrocarbon-based reaction medium. The patent however does not disclose the above process being conducted in an homogeneous liquid phase.

The EVOH obtained by saponification of ethylene-vinyl acetate copolymer in the presence of sodium hydroxide catalyst is, in the form of solution in methanol, subjected to a primary processing of extrusion into a non-solvent for the copolymer, such as water, or a mixed solvent of methanol and the non-solvent to form strands, chips or the like shapes, followed by drying thereof. These shaped articles thus obtained are then again melt or dissolved and, in the form of melts (dry processing) or a solution in a specific solvent (wet processing), generally subjected to a secondary processing into fiber, hollow fiber, film, granules or like desired shapes, to give finished products. This known process contains, in addition to the afore-described problems 1), 2) and 3), the following points to improve.

4) EVOH is not provided with sufficient thermal stability and tends to suffer thermal degradation and form irregular matter during a long-time drying after the extrusion into water, which will cause gels to generate during the secondary processing.

5) High-polymerization-degree EVOH's having an [$\eta$]inh exceeding the range of 0.099 to 0.110 1/g have high solution viscosity, so that they readily form gels during drying and like processes, which remain undissolved upon re-dissolving.

The EVOH's having a high degree of polymerization as above that form by saponification are, in the form of solution in methanol, subjected to a primary processing of extrusion into a non-solvent for the copolymer, such as water, or a mixed solvent of methanol and the non-solvent to form strands, chips or the like shapes, followed by drying thereof. These shaped articles thus obtained are then again melt or dissolved and, in the form of melts (dry processing) or a solution in a specific solvent (wet processing or dry-jet-wet processing), generally subjected to a secondary processing into fiber, hollow fiber, film, granules or like desired shapes, to give finished products. This known process contains, in addition to the afore-described problems 1) through 5), the following points to improve.

6) In a copolymerization zone of ethylene-vinyl ester and containing methanol, the degree of polymerization of the resultant ethylene-vinyl ester copolymer decreases with increasing amount of methanol present. To suppress the decrease in the degree of polymerization, unfavorable process conditions should be employed, such as lowering polymerization temperature, lowering polymerization rate and suppression of the amount of methanol added.

7) Even when attempts are made to obtain EVOH's with a wide range of ethylene content, by polymerization using methanol, the content of ethylene has an upper limit so that EVOH with high ethylene content is difficult to obtain.

SUMMARY OF THE INVENTION

Accordingly, an object of the present invention is to provide an inexpensive and rational process for producing ethylene-vinyl esters which is free from the problems described hereinabove and can provide ethylene-vinyl esters having wider range of ethylene content and degree of polymerization than those of the known ethylene-vinyl ester copolymers.

A further object of the present invention is to provide an inexpensive and rational process for producing the known EVOH, which is free from the problems described hereinabove.

A still further object of the present invention is to provide a more inexpensive and rational process, which is free from the problems described hereinabove, for producing EVOH shaped articles than the known process therefor.

Another object of the present invention is to provide an inexpensive and rational process, which is free from the problems described in hereinabove, for producing shaped articles from EVOH's having wide ranges of ethylene content and degree of polymerization.

The above first object can be achieved by providing a process for producing ethylene-vinyl esler copolymer by copolymerizing ethylene and a vinyl ester in the presence of a radical initiator, said process comprising using a dialkyl sulfoxide as a polymerization solvent.

The above second object can be achieved by providing a process for producing ethylene-vinyl alcohol copolymer by saponification of an ethylene-vinyl ester copolymer, said process comprising using a solvent of a dialkyl sulfoxide and conducting saponification in a liquid phase.

The above third object can be achieved by providing a process for producing shaped articles of ethylene-vinyl alcohol copolymer (B) comprising the combination of:

(I) a process which comprises conducting saponification of an ethylene-vinyl ester copolymer (A) in a liquid phase using a solvent of a dialkyl sulfoxide to produce a solution of the resulting ethylene-vinyl alcohol copolymer (B), and (II) a process which comprises contacting the above solution of the ethylene-vinyl alcohol copolymer (B) obtained in the process (I) with a non-solvent for the copolymer (B) or a mixed solvent containing at least 20% by weight of said non-solvent.

The above fourth object can be achieved by providing a process for producing shaped articles of ethylene-vinyl alcohol copolymer (B) comprising the combination of:

(I)' a process which comprises copolymerizing ethylene and a vinyl ester using a polymerization solvent of a dialkyl sulfoxide and in the presence of a radical initiator, to obtain a solution of an ethylene-vinyl ester copolymer (A);

(II)' a process which comprises distilling off unreacted vinyl ester from said solution of said ethylene-vinyl ester copolymer (A) while maintaining the viscosity of said solution at not more than 500 poises;

(III)' a process which comprises conducting saponification of the solution of said copolymer (A) obtained by the process (II)' to obtain a solution of the resulting ethylene-vinyl alcohol (B); and (IV)' a process which comprises contacting said solution of said ethylene-vinyl alcohol copolymer (B) obtained in the process (III)' with a non-solvent for said copolymer (B) or a mixed solvent containing at least 20% by weight of said non-solvent.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
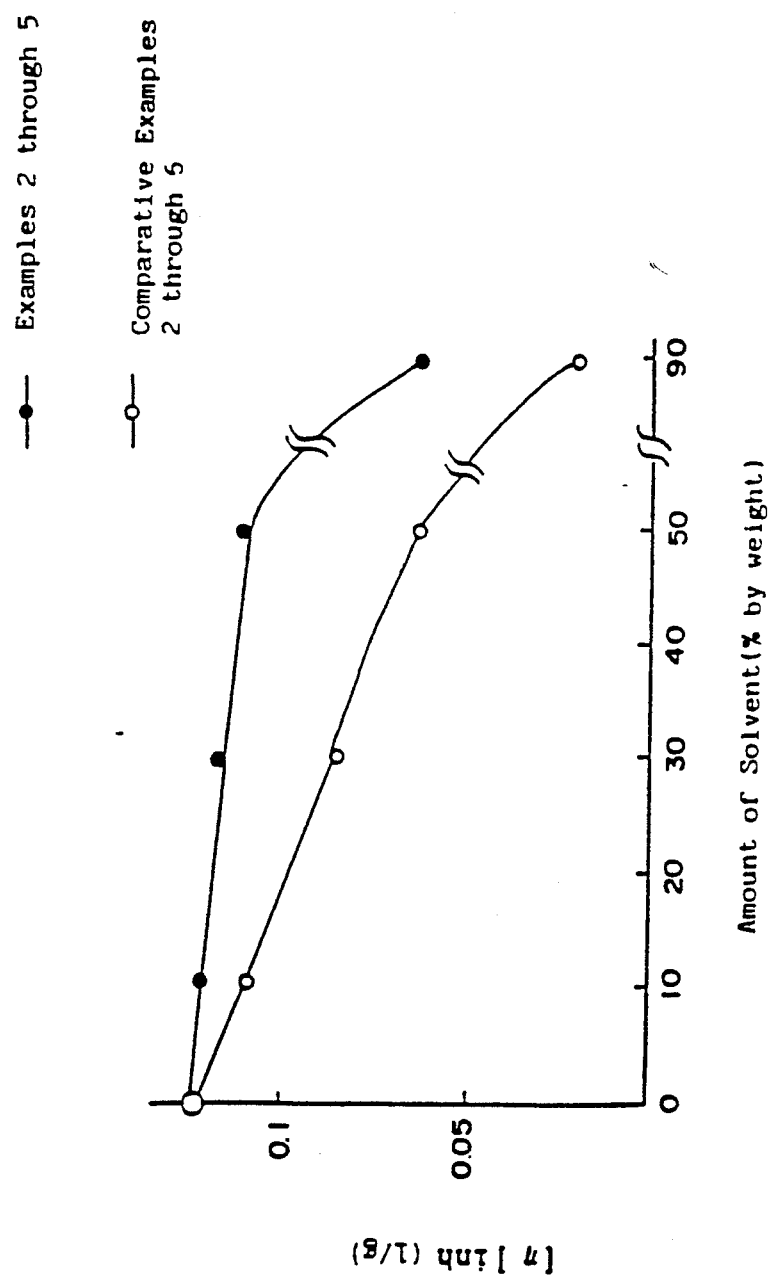
FIG. 1 is a graph with the abscissa showing the amount of solvent (% by weight) and the coordinate showing the inherent viscosity [$\eta$] (l/g) of EVOH, in Examples 2 through 5 and Comparative Examples 2 through 6.

According to one embodiment of the present invention, ethylene-vinyl ester copolymers, the degree of polymerization of which has not been decreased to a large extent, are readily formed by solution polymerization in dialkyl sulfoxide over a wide range of ethylene content. Further in the succeeding process for removing unreacted vinyl ester, the homogeneous solution state can be maintained by adjusting the concentration of the dialkyl sulfoxide in the system. These features realize a stable continuous operation of the process.

Experiments carried out by the present inventors showed the following facts. Where an attempt was made to obtain an ethylene-vinyl acetate copolymer (hereinafter sometimes referred to as "EVA") having an ethylene content of 60 mol % by reacting ethylene and vinyl acetate at 50° C. in a system comprising 20 parts by weight of methanol and 80 parts by weight of vinyl acetate, EVA started precipitating in the polymerization zone already at a stage of low conversion, thereby causing the polymerization zone to become heterogeneous. On the other hand, where dimethyl sulfoxide was used according to the present invention, no formation of precipitates was observed even at a conversion of about 70%. Besides, while an EVA having an ethylene content of 32 mol % and obtained by conducting polymerization at 40° C. to a conversion of 20% in a system comprising 10 parts by weight of methanol and 90 parts by weight of vinyl acetate gives by saponification an EVOH having an [$\eta$]inh of 0.135 l/g, the [$\eta$]inh obtained under the same conditions except for using dimethyl sulfoxide solvent, i.e. same polymerization, same conversion and same ethylene content, was 0.149 l/g. These facts show that the use of dimethyl sulfoxide in place of methanol as a polymerization solvent for copolymerizing ethylene and vinyl ester gives a copolymer having higher inherent viscosity.

The EVOH obtained by saponifying the ethylene-vinyl ester copolymer obtained by the process of the present invention has an [$\eta$]inh of not more than 0.4 l/g, preferably not more than 0.35 l/9, more preferably not more than 0.30 l/g, and at least 0.05 l/g, preferably at least 0.06 l/g, more preferably at least 0.07 l/g.

According to the process of the present invention, copolymerization is conducted by adding a radical initiator to a mixed solution containing a vinyl ester and at least 1% by weight of a dialkyl sulfoxide, under pressurization by ethylene. The ethylene content and inherent viscosity of the obtained copolymer vary depending on the ethylene pressure, polymerization temperature, polymerization rate, conversion, composition of the vinyl ester monomer and solvent used and like polymerization conditions. These conditions should strictly be adjusted for the purpose of obtaining a copolymer having the desired ethylene content and inherent viscosity.

In the present invention, it is preferred that the ethylene content of the obtained copolymers be 0.1 to 80 mol %. With an ethylene content of less than 0.1 mol %, the EVOH obtained by saponification does not produce substantial effect of improving water resistance and like properties as compared with those of polyvinyl alcohol. The ethylene content is more preferably at least 1 mol %, still more preferably at least 5 mol %, yet more preferably at least 10 mol % and most preferably at least 20 mol %. On the other hand in a region where the ethylene content exceeds 80 mol %, the copolymer becomes difficult to dissolve in dimethyl sulfoxide. More preferred from the viewpoint of solubility of the copolymer the ethylene content is not more than 70 mol %.

The vinyl esters usable in the present invention are vinyl esters of lower aliphatic acids having not more than 5 carbon atoms, the representative example being vinyl acetate, and also vinyl propionate. In the present invention, ethylenically unsaturated monomers other than ethylene and vinyl esters may also be used within limits not to impair the purpose of the present invention. Representative ethylenically unsaturated monomers are given for example in "POVAL (revised edition)"(published by Kobunshi Kankokai, on Apr. 1, 1981) on pages 281-285 and also in the literature cited therein.

Thus, examples of such monomers are olefins having 3 to 18 carbon atoms; vinyl carboxylates, such as vinyl versatate and vinyl stearate; alkyl vinyl ethers, such as lauryl vinyl ether and methyl vinyl ether; (meth)acrylates, such as methyl (meth)acrylate; acrylamides, such as acrylamide, methaccrylamide and N,N-dimethylacrylamide; unsaturated carboxylic acids, their esters and their anhydrides, such as acrylic acid, crotonic acid, maleic acid, fumaric acid, itaconic acid, esters and anhydrides of the foregoing; sulfonic acid monomers, such as vinylsulfonic acid and acrylsulfonic acid; cationic monomers, such as dimethylaminoethyl methacrylate, vinylimidazole, vinylpyridine and vinylsuccinimide; vinylene carbonate; allyl alcohol and allyl acetate.

The dialkyl sulfoxide used in the present invention comprises a lower alkyl group, the carbon number of which is preferably not more than 3 in view of solubility for the intended ethylene-vinyl ester copolymer and EVOH. Examples of the dialkyl sulfoxide are dimethyl sulfoxide, diethyl sulfoxide, di-i-propyl sulfoxide, di-n-propyl sulfoxide, methylethyl sulfoxide and methyl-i-propyl sulfoxide. Among the above dimethyl sulfoxide is particularly preferred, since it gives ethylene-vinyl ester copolymers having high degree of polymerization, is thermally and chemically safe and is readily available. The dialkyl sulfoxide used preferably has a water content of not more than 2% by weight, more preferably not more than 1% by weight.

In the present invention, copolymerization proceeds in the liquid phase. The term "liquid phase" herein means a substantially homogeneous liquid phase.

It is preferred that the content of dialkyl sulfoxide in the polymerization zone, i.e. the ratio of the amount of dialkyl sulfoxide to the sum of the amounts of dialkyl sulfoxide and vinyl ester, be at least 1% by weight. The content is more preferably, although depending on the ethylene content and inherent viscosity of the desired EVA, at least 3% by weight, most preferably at least 5% by weight, in view of heat removal from the polymerization zone, stability with respect to prevention of abnormal polymerization, maintenance of homogeneous state of solution and ease of feeding radical initiator.

If the content of dialkyl sulfoxide is less than 1% by weight, the system will substantially become equal to bulk polymerization, where it is difficult to prevent occurrence of abnormal polymerization and the like and to feed radical initiator uniformly. There is no specific upper limit to the content of dialkyl sulfoxide, but it is preferably not more than 80% by weight, more preferably not more than 70% by weight from the viewpoint of production efficiency of the desired copolymer. Copolymers having an ethylene content of 0.1 to 80 mol % are produced under an ethylene pressure properly selected in consideration of the intended inherent viscosity of the copolymer and polymerization conditions. The ethylene pressure therefore cannot be definitely designated, but it is generally in a range of atmospheric pressure to 100 kg/cm$^2$. The polymerization temperature is, while being closely related to the intended inherent viscosity and ethylene content of the copolymer, selected from a range of about 0° to 80° C. Copolymers with normal inherent viscosity are obtained at a temperature of 40° to 80° C., while those with higher inherent viscosity are obtained at a lower temperature, e.g. 40° C. or below.

The radical initiators usable in the copolymerization of the present invention include known azo compounds such as 2,2'-azobisisobutyrontrile, 2,2'-azobis-(4-methoxy-2,4-dimethylvaleronitrile) and peroxides such as benzoyl peroxide and isopropyl peroxydicarbonate. The initiators are used in an amount of 0.001 to 1.0% by weight based on the weight of vinyl ester monomer, preferably 0.01 to 0.5% by weight on the same basis. Adjusting the amount of the initiator fed can adjust, as well as the degree of removal of heat of polymerization, the polymerization rate which influences the inherent viscosity of the resulting copolymer and the like.

In the present invention, the polymerization can be conducted by any process such as batch system, semi-batch system or continuous polymerization, among which, however, continuous system is preferred in view of removal of heat of polymerization, stability of qualities of the copolymer, stability of polymerization zone and other factors.

The homogeneous solution comprising the copolymer produced, unreacted vinyl ester monomer, ethylene, dialkyl sulfoxide and a trace amount of initiator are subjected, if necessary to deactivation treatment of the initiator, then to recovery treatment of the dissolving ethylene in the solution, and then sent to the succeeding process for recovery of unreacted vinyl ester monomer. The recovery can be accomplished by adding an amount of dialkyl sulfoxide to maintain the viscosity of the solution within a specific range and recovering the vinyl ester monomer in a substantially homogeneous liquid phase. The viscosity maintained is preferably not more than 500 poises, more preferably not more than 300 poises, most preferably not more than 100 poises. The lower limit of the viscosity is generally about 1 poise, although not strictly restricted thereto. The recovery operation is preferably conducted, in consideration of thermal stability of vinyl ester monomer, by maintaining the bottoms temperature at not more than 100° C., more preferably not more than 80° C. and under atmospheric pressure or reduced pressure (in either case, not higher than the boiling point of the vinyl ester used). It is also one of the preferred embodiments of the present invention to recover vinyl ester monomer such as vinyl acetate at a low temperature and under atmospheric pressure by adding the lower alcohol that is to be used as a reaction agent for the succeeding saponification and thus utilizing azeotrope of the vinyl ester monomer and the lower alcohol, particularly methanol. The recovery may be conducted with a stirred-tank system, column system or thin membrane evaporator, among which preferred are column system and thin membrane evaporator in view of recovery efficiency, equipment cost and adaptability to continuous operation. Unrecovered vinyl ester monomer may be a factor for coloration in the succeeding saponification, and hence the content of the vinyl ester monomer after having passed the recovery system is preferably reduced to not more than 0.5% by weight, more preferably not more than 0.2% by weight.

The ethylene-vinyl ester copolymer, such as EVA, obtained by the present invention can be converted by saponification to the corresponding EVOH. The saponification may be conducted by the known alkaline saponification or acid saponification, but most suitably by saponification in methanol solvent in the presence of alkaline catalyst such as sodium hydroxide or sodium methylate. The methanol used for saponification may contain the dialkyl sulfoxide such as dimethyl sulfoxide used in the polymerization.

Next described in detail is the process for producing EVOH of the present invention that achieves the afore-mentioned second object. This process realizes far accelerated saponification as compared with conventional processes. This process, which is one of the present invention, can rationally solve the afore-mentioned problem 2) and realize a low production cost. Thus, the present invention uses a reaction solvent of dialkyl sulfoxide in place of the known methanol and effectively utilizes the specific dissolving behavior of said solvent against ethylene-vinyl ester copolymers and EVOH's, thereby realizing proceeding of reaction always in a homogeneous state even when the ethylene content and inherent viscosity of the resulting copolymer are extended beyond the usual specification.

While the process of the present invention is carried out by homogeneously dissolving an ethylene-vinyl ester copolymer in a mixed solvent of a dialkyl sulfoxide and a lower alcohol, an extensive study made by the present inventors revealed that the rate of saponification of ethylene-vinyl ester in the present invention is higher than that with a single solvent of lower alcohol. Ethylene-vinyl ester copolymers generally have lower reaction rate than that of the vinyl ester homopolymers, and the saponification thereof should therefore employ undesirable conditions such as increasing the reaction temperature and increasing the amount of alkaline catalyst added. By employing the process of the present invention, reaction under milder conditions has become possible.

In the known usual process comprising using a single solvent of lower alcohol, saponification in a homogeneous system can only be conducted, because of low solubility of the resulting EVOH in the lower alcohol, by elevating the reaction temperature, thereby increasing the solubility. By the restriction with respect to solubility, it is very difficult, or sometimes practically impossible, in the known process to saponify by alcoholysis in homogeneous state an ethylene-vinyl ester copolymer having an ethylene content of not more than 25 mol % or not less than 45 mol %. The present invention provides a solution also to such a situation. Dialkyl sulfoxides are good solvent both for ethylene-vinyl ester copolymers and EVOH's, so that the reaction zone can be maintained homogeneous without increasing the reaction temperature and prevent undesirable phenomena such as increased deactivation of catalyst and thermal degradation of the copolymers.

The saponification of the present invention proceeds in the liquid phase. The term "liquid phase" herein means substantially homogeneous liquid phase.

In the reaction zone of the present invention, lower alcohol ester of aliphatic acid such as acetic acid forms by reaction, and hence it becomes necessary for the purpose of increasing the saponification degree to shift the saponification equilibrium to the formed product side. For this reason, it is desired to efficiently distill off the ester used, e.g. methyl acetate. An extensive study made by the present inventors revealed that dialkyl sulfoxide present in the reaction zone has the effect of increasing efficiency of separating vinyl ester and lower alcohol. The mixture may be removed by distillation by either distilling off under reduce pressure and in tank system or, in column system, conducting saponification while introducing the ethylene-vinyl ester copolymer dissolved in dialkyl sulfoxide through the middle stage of a reaction column and blowing alcohol vapor through the bottom stage, and at the same time distilling off lower alcohol and the alcohol ester of aliphatic acid from the top stage. The use of this effect can markedly reduce the number of stages and reflux ratio of distillation column, thus contributing to reduction in equipment cost and utility cost.

The degree of saponification of the EVOH can be selected depending on the intended use of the copolymer and is preferably at least 20%, more preferably at least 50%. (When the degree of saponification is expressed in "%", the "%" means "% by mole", which will apply hereinafter.) For use in fields reguiring high gas barrier properties, the saponification degree is preferably at least 99.0% and more preferably at least 99.5%.

The dialkyl sulfoxide used in the present invention comprises a lower alkyl group having, preferably, not more than 3 carbon atoms in view of solubility for ethylene-vinyl ester copolymers and EVOH's. Examples of the dialkyl sulfoxide are dimethyl sulfoxide, diethyl sulfoxide, di-i-propyl sulfoxide, di-n-propyl sulfoxide, methylethyl sulfoxide and methyl-i-propyl sulfoxide, among which dimethyl sulfoxide and diethyl sulfoxide are preferred in consideration of thermal and chemical stability, price and the like. Dimethyl sulfoxide is particularly preferred based on overall judgement. The dialkyl sulfoxide is used in any amount insofar as it homogeneously dissolves ethylene-vinyl ester copolymer and EVOH. In consideration of the solution viscosity and the like, the amount is preferably, in terms of the concentration of ethylene-vinyl ester copolymer in the dialkyl sulfoxide solution, 0.1 to 70% by weight based on the sum of the weights of ethylene-vinyl ester copolymer and the dialkyl sulfoxide, more preferably 1 to 50% by weight on the same basis.

In the present invention, lower alcohol is used as a reaction agent for saponification. The production of EVOH's by saponification of the corresponding ethylene-vinyl acetate copolymers is known. The rate of this saponification is generally lower than that of polyvinyl acetate, which is homopolymer of vinyl acetate, and tends to decrease with increasing content of ethylene. Extensive study by the present inventors on saponification of ethylene-vinyl ester copolymers has revealed that it is desirable to use lower alcohols for the saponification and in particular monohydric alcohols having 1 to 5 carbon atoms. Examples of lower monohydric alcohols having 1 to 5 carbon atoms are methanol, ethanol, n-propanol, n-butanol, i-butanol, n-amyl alcohol and i-amyl alcohol. Among the above, methanol or ethanol is suitably used in view of solubility for ethylene-vinyl ester and the like, and particularly preferred is the use of methanol in view of reaction rate. The lower alcohol is used in any amount insofar as it is sufficient for producing EVOH by saponification of the corresponding ethylene-vinyl ester copolymer. The amount is generally 1.0 to 50 molar equivalents based on the theoretical mole calculated from the average molecular weight of the ethylene-vinyl ester copolymer, and is preferably 1.5 to 30 molar equivalent, more preferably 2.0 to 20 molar equivalents on the same basis in view of reaction equilibrium of saponification, after-treatment cost for the alcohol fed and like factors.

The saponification of the present invention is conducted in the presence of an alkaline catalyst. The alkaline catalysts usable in the invention are known ones used in the saponification by alkaline catalyst of polyvinyl acetate or ethylene-vinyl acetate copolymers. Examples of such catalysts are alkali metal hydroxides, such as sodium hydroxide, potassium hydroxide and lithium hydroxide; alkali metal alcolate, such as sodium methylate and potassium t-butoxide; strong base amine, represented by 1,8-diazabicyclo[5,4,0]-undecene-7 (DBU); alkali metal carbonates and alkali metal hydrogencarbonates, among which sodium hydroxide is preferred because of easy handling and low price. The amount of catalyst used varies depending of the intended degree of saponification and reaction temperature, but is generally in a range of 0.001 to 1.0 mole per mole calculated from the average molecular weight of the ethylene-vinyl ester copolymer.

The reaction temperature for the saponification of the present invention may be optionally and as required selected from a range of room temperature to about 150° C., but preferably 40° to 120° C., more preferably 50° to 100° C. for the purpose of achieving high reaction rate under atmospheric pressure.

The saponification of ethylene-vinyl ester copolymer may be conducted by stirred-tank system, column system or the like. One preferred embodiment is a column system which comprises introducing dialkyl sulfoxide having dissolved the copolymer through the middle stage of a reaction column and blowing alcohol vapor through the bottom stage, and withdrawing byproduct alkyl ester, e.g. methyl acetate, from the top stage.

It is preferred in the present invention that the alcoholysis be conducted under the condition where oxygen has been substantially removed; for example with an oxygen concentration of not more than $5 \times 10^{-4}$ mol/l since, then, decrease in the degree of polymerization is suppressed. For maintaining the oxygen concentration at the above level or below, the reaction zone is either substituted by nitrogen gas with at least 99.9% purity or heated at 60° C. or above and then substituted with nitrogen or argon.

Now described is the process for producing shaped articles of EVOH that achieves the afore-recited third object of the present invention.

The process of the invention comprises obtaining EVOH (B) in a homogeneous solution by dissolving the corresponding ethylene-vinyl ester copolymer in a mixed system of a dialkyl sulfoxide and a lower alcohol as a reaction agent, to conduct saponification in the presence of alkaline catalyst. The homogeneous solution can be, after being, if necessary, subjected to concentration adjustment, without being subjected to the known primary processing of EVOH (B) into strands or chips, directly and in the form of solution as it is, subjected to what is known as "secondary" processing into optional shape, such as fiber, hollow fiber, film, sheet or granules, by wet or dry-jet-wet system. The process of the present invention can rationally eliminate the aforementioned problems associated with the usual process and realize a low production cost. The process of the present invention uses, in lieu of known methanol, a dialkyl sulfoxide as a reaction solvent and utilizes the specific dissolution behavior of the solvent against the above copolymers (A) and (B), thereby assuring proceeding of reaction always in a homogeneous state even when the ethylene content and degree of polymerization of the copolymer extend beyond the usual specification. Stable operation is then achieved. Moreover, since the copolymer (B) is, without being isolated in the course of processes, sent in the form of solution to the final processing step, deterioration in the reaction zone and/or upon processing is minimized, whereby stable quality is obtained. The saponification conditions are the same as described above.

The solution of the copolymer (B) obtained is, after being confirmed for the saponification degree of the copolymer (B), subjected to neutralization to deactivate the catalyst and, as required, subjected to adjustment of the concentration of the copolymer (B). Dialkyl sulfoxides generally have higher boiling point than those of lower alcohols and aliphatic acid lower alcohol esters, and hence the copolymer (B) may be obtained as a solution in dialkyl sulfoxide, which may or may not contain lower alcohol and aliphatic acid lower alcohol ester. The solution of the copolymer (B) in the dialkyl sulfoxide thus treated is sent to shaping process and contacted with a non-solvent for the copolymer (B) or a mixed solvent containing at least 20% by weight of the non-solvent, thereby being formed into fiber, hollow fiber, film, sheet, granules, strands, spheres or other desired shapes, by wet or dry-jet-wet system. If the non-solvent content is less than 20% by weight, the amount of the copolymer (B) dissolved in the mixed solvent will increase, whereby wet or dry-jet-wet processing utilizing coagulation becomes incomplete. The content of the non-solvent is preferably at least 40% by weight, more preferably at least 50% by weight for the purpose of achieving complete coagulation of the copolymer (B). The coagulation temperature varies depending on the shape to form, but it isgenerally in a range of −20° to 100° C., preferably −10° to 50° C. Further in the present invention, the above copolymer (B) solution in dialkyl sulfoxide may for example be extruded onto a base material, and then the extrudate be contacted (e.g. by immersion) with a non-solvent for the copolymer (B) or a mixed solvent containing at least 20% by weight of the non-solvent, to give shaped articles.

The above shaped articles obtained by wet or dry-jet-wet processing may further be processed. Thus, the granules and spheres as they are, and the strands, after being cut to pellets having a desired shape, may by processed into fiber, hollow fiber, film, sheet, bottles or like desired shapes, by melt molding, wet processing, dry processing or dry-jet-wet processing.

Examples of the non-solvent for copolymer (B) are, although their effect varies depending on the ethylene content of copolymer (B), solvents having compatibility with dialkyl sulfoxide, e.g. water; lower alcohols, such as methanol and ethanol; esters, such as methyl acetate and ethyl acetate; ketones, such as acetone and diethyl ketone; and ethers, such as ethylene glycol dimethyl ether; and mixtures of the foregoing. For copolymers (B) with low ethylene content, generally effective are alcohols represented by methanol, ketones such as acetone and esters such as methyl acetate. On the other hand, for copolymers (B) with high ethylene content, water and esters such as methyl acetate are effective. Employment of this shaping process of wet or dry-jet-wet system prevents formation of gels and irregular matters caused by thermal degradation and encountered during processing including drying by conventional process, and realizes improvement of product performances. Examples of the solvent usable in combination with the above non-solvent are dialkyl sulfoxides, particularly dimethyl sulfoxide.

Shaped articles obtained by the above process can be used for various purposes, including high-performance EVOH fiber having improved water resistance, EVOH hollow fiber having excellent permeability performances and used for artificial kidney and the like, high-performance films for optical uses, films for industrial uses, gas-barrier packaging materials having good thermal stability, sealants and biodegradable material utilizing good compatibility with starch.

The copolymers (B) formed into the above various shapes are subjected to extraction and washing off of the solvent dialkyl sulfoxide, deactivated catalyst and the like and then dried to give finished products.

Lastly, the process for producing EVOH shaped articles of the present invention that achieves the aforementioned fourth object of the present invention.

In this process of the present invention, all of polymerization process (I)', process (II)' for removal by distillation of remaining monomer, saponification process (III)' and process (IV)' of contacting with non-solvent are the same as already described.

The process of the present invention uses, in lieu of known methanol, a dialkyl sulfoxide as a reaction solvent and utilizes the specific dissolution behavior of the solvent in the polymerization zone, thereby rendering it possible to produce copolymers with their degree of polymerization having decreased to a lesser extent than the case with conventional process. This process assures proceeding of reaction always in a homogeneous state even when the ethylene content and degree of polymerization of the copolymer extend beyond the usual specification, thus realizing stabilization and shortening of processes. Moreover, the copolymer (B) is, without being isolated in the course of processes, subjected to reaction under mild conditions and then directly to the final processing of wet or dry-jet-wet processing to give finished product. Since the number of processes is thus reduced, (thermal) deterioration of the copolymer upon processing is minimized, whereby stable quality is obtained.

The process of the present invention establishes, based on detailed study by the present inventors, an ethylene-vinyl ester copolymerization system with a dialkyl sulfoxide solvent, where decrease in the degree of polymerization is smaller than with the known methanol solvent system [process (I)']. In this copolymerization system, it is possible to maintain homogeneous reaction systems over a wide range of ethylene content, and in the succeeding process of removing unreacted vinyl ester [process (II)'] the homogeneous solution condition can be, as it is, maintained by adjusting the concentration in the system by the dialkyl sulfoxide to a solution viscosity of not more than 500 poises, whereby stable continuous operation of the process is realized.

The process (III)' in the process of the present invention comprises conducting saponification in a homogeneous solution system comprising the copolymer (A) solution in dialkyl sulfoxide to which a reaction agent of lower alcohol has been added. Intensive study by the present inventors has revealed that, in the present invention, the rate of saponification of the copolymer (A) is higher than that with a single solvent system comprising lower alcohol. As described before, copolymers (A) generally have lower reaction rate of saponification than that of vinyl ester homopolymer, and the saponification thereof should therefore employ undesirable conditions such as increasing the reaction temperature and increasing the amount of alkaline catalyst added. By employing the process of the present invention, reaction under milder conditions becomes possible.

In the known usual process comprising using a single solvent of lower alcohol, saponification in a homogeneous system can only be conducted, because of low solubility of the resulting copolymer in the lower alcohol, by elevating the reaction temperature, thereby increasing the solubility. By the restriction with respect to solubility, it is very difficult, or sometimes practically impossible, in the known process to saponify by alcoholysis in a homogenoeous state a copolymer (A) having an ethylene content of not more than 25 mol % or not less than 45 mol %. The present invention provides a solution also to such circumstances. Dialkyl sulfoxides are good solvent both for copolymers (A) and copolymers (B), so that the reaction zone can be maintained homogeneous without increasing the reaction temperature and avoid undesirable phenomena such as increased deactivation of catalyst and thermal degradation of the copolymers.

In the reaction zone of the present invention, lower alcohol ester of aliphatic acid forms by saponification reaction, and hence it becomes necessary to shift the saponification equilibrium to the formed product side. For this reason, it is desired to efficiently distill off the aliphatic acid ester. An extensive study made by the present inventors revealed that dialkyl sulfoxide present in the reaction zone has the effect of increasing efficiency of separating aliphatic acid ester and lower alcohol. The use of this effect can markedly reduce the number of stages and reflux ratio of distillation column, thus contributing to reduction in equipment cost and utility cost.

Shaped articles obtained by the above process can be used for various purposes, including high-performance EVOH fiber having improved water resistance, EVOH hollow fiber having excellent permeability performances and used for artificial kidney and the like, high-performance films for optical uses, films for industrial uses, gas-barrier packaging materials having good thermal stability, sealants and biodegradable material utilizing good compatibility with starch.

The copolymers (B) formed into the above various shapes are subjected to extraction and washing off of the solvent dialkyl sulfoxide, deactivated catalyst and the like and then dried to give finished products.

As stated heretofore, the processes of the present invention can produce the following effects.

Ethylene-vinyl ester copolymers having a wide range of ethylene content can be obtained. Since the polymerization zone is maintained in a substantially homogeneous liquid phase, the resulting ethylene-vinyl ester copolymer and further the EVOH obtainable therefrom both have uniform properties and residual monomer can readily be recovered. Furthermore, there can be obtained ethylene-vinyl ester copolymers with higher polymerization degree than that with solution polymerization using methanol.

The rate of saponification is higher than that with single solvent of lower alcohol; and since the alcohol reaction zone is maintained in a substantially homogeneous liquid phase, the obtained EVOH has uniform properties.

The saponification rate decreases only little with increasing ethylene content. What is interesting is the relative rate ratio (the reaction rate with dialkyl sulfoxide/that with methanol) tends to increase with increasing ethylene content. The process of the present invention therefore is very effective for the saponification of high-ethylene ethylene-vinyl ester copolymers.

Production cost is low, since production process of EVOH is directly connected to that of shaped articles.

Production cost is low, since production process of ethylene-vinyl ester copolymer having a wide range of ethylene content is directly connected to saponification of the ethylene-vinyl ester copolymer into EVOH and further to that of shaped articles using the EVOH.

Besides, the EVOH obtained by the process of the present invention exhibits characteristics inherent thereto, such as a lower melting point than that of the usual EVOH obtained by polymerization and/or saponification in a lower alcohol system. This is apparent from Example 7-1 described later herein and attributable to the fact that the EVOH of the present invention has specific stereotactic structure resulting from DMSO-based polymerization and/or specific distribution of residual ester groups (i.e. more randomized distribution) resulting from DMSO-based saponification.

It is expected that proper use of these characteristics contribute to for example, in melt stretching processing of EVOH, minimizing generation of gels and irregular matters caused by thermal degradation, improvement in stretching speed and stretching ratio, reduction in the number of voids and cracks, improvement in thickness uniformity, realization of stable processing operation over long period of time and so forth.

The above-described fact that the EVOH obtained by the process of the present invention has more randomized (i.e. sharper) distribution of residual ester groups is indicated by larger block character.

The EVOH obtained by the process of the present invention preferably has a block character of at least 0.2, more preferably at least 0.25 and most preferably at least 0.3.

The block character is calculated by:

Block character = (OH-OAc)/2(OH)(OAc)

where (OH-OAc) indicates the ratio of the mole fraction of dyad of vinyl alcohol moiety-vinyl ester moiety to the sum of mole fractions of dyads {vinyl alcohol moiety-vinyl alcohol moiety ($A_1$) + vinyl alcohol moiety-vinyl ester moiety ($A_2$) + vinyl ester moiety-vinyl ester moiety ($A_3$)}, and (OH) and (OAc) indicate the mole fraction of vinyl alcohol moieties and that of vinyl ester moieties, respectively, in dyads and chains longer than dyad, in the EVOH.

The mole fraction of dyad of vinyl alcohol moiety-vinyl alcohol moiety ($A_1$) is obtained from the absorption intensity of the peak in the range of $\delta = 45.7-48$ ppm in $^{13}$C-NMR spectrum and that ($A_2$) of vinyl ester moiety-vinyl ester moiety from the absorption intensity of the peak in the range of $\delta = 43.5-45.5$ ppm. The mole fraction ($A_3$) of dyad of vinyl ester moiety-vinyl ester moiety is obtained by subtracting the above $A_1$ and $A_2$ from the square of the sum of the mole fractions of vinyl alcohol moieties and vinyl ester moieties in the EVOH.

Other features of the invention will become apparent in the course of the following descriptions of exemplary embodiments which are given for illustration of the invention and are not intended to be limiting thereof. In the Examples that follow, the inherent viscosity, [$\eta$]inh, of EVA means that of the EVOH obtained by completely saponifying EVA (degree of saponification: at least 99.4%).

EXAMPLES

Example 1

A 3-liter high-pressure autoclave equipped with a stirrer was charged with 252 g of dimethyl sulfoxide (hereinafter referred to as DMSO) (water content: 0.1% by weight), 1,009 g of vinyl acetate (hereinafter referred to as VAc) (DMSO/VAc=2/8 by weight) and 0.040% by weight based on the weight of VAc of azobisisobutyronitrile (AIBN) and the system was sufficiently substituted with ethylene. The autoclave was pressurized by ethylene to a pressure of 43 kg/cm$^2$G and at a reaction temperature of 60° C., to conduct polymerization for 5 hours. After the completion of polymerization, 1,200 g of DMSO was added to the polymerization solution and unreacted monomer was removed by evaporation (50 mmHg or below, 40° C.). The solution had a viscosity of 12 poises when the evaporation started and that of 21 poises when it finished. The solution after the removal was thrown into pure water, to cause EVA to precipitate. The precipitates were washed with water, and the polymer was heated and boiled in water, to remove unreacted monomer, and sufficiently dried, to give an EVA having an ethylene content of 32 mol %, in a conversion of 50%. In 100 g of methanol, 25 g of the obtained EVA was dissolved, and to the solution 29.5 g of 10% sodium hydroxide (hereinafter sometimes referred to as NaOH) solution in methanol (hereinafter referred to as MeOH) was added (NaOH/EVA=0.2 by moles). The mixture was kept at 60° C. for 0.5 hour and again 29.5 g of the NaOH solution was added. The mixture was kept at 60° C. for 2 hours to effect saponification. The polymer solution thus obtained was thrown into an aqueous acetic acid solution to give precipitates and the mixture was allowed to stand for 0.5 hour. After dehydration, the polymer was immersed in the aqueous acetic solution for further 0.5 hour and then in tap water for 0.5 hour. The polymer was pulverized and sufficiently dried, to give an EVOH.

The EVOH thus obtained had a degree of saponification of 99.5% and an [$\eta$]inh of 0.119 l/g. As control (Comparative Example 1) an EVOH having a degree of saponification of 99.5% and an [$\eta$]inh of 0.097 l/g was obtained as follows. The same autoclave as above was charged with 243 9 of methanol, 972 g of vinyl acetate (MeOH/VAc=2/8 by weight), and 0.104% by weight based on the weight of VAc of azobisisobutyronitrile.

The autoclave was sufficiently substituted with ethylene, polymerization was conducted at 60° C. and under ethylene pressure of 41 kg/cm²G for 5 hours. After the completion of polymerization, the same aftertreatments as with the above DMSO system were conducted to obtain an EVA having an ethylene content of 32 mol % in a conversion of 50%. The EVA thus obtained was saponified in the same manner as with the above DMSO system, to give the desired EVOH. In both of the above two Examples, the polymerization proceeded always in a homogeneous liquid phase, which was confirmed by observation on samples of polymerization solution taken from time to time during the polymerization. The above results suggest that EVOH obtained by solution polymerization using a solvent of DMSO has higher inherent viscosity than EVOH obtained with MeOH solvent.

Examples 2 through 5

Example 1 was repeated except for changing the amount of DMSO used, to obtain several EVA's, which were then saponified in the same manner to give EVOH's. The EVOH's obtained (ethylene content: 32 mol %, degree of saponification: 99.4 to 99.7%) were tested for inherent viscosity.

As control, bulk polymerization (no solvent) and solution polymerization with MeOH solvent in the same compositions as with DMSO solvent were conducted (Comparative Examples 2 through 6). The polymerization conditions were, for the purpose of confirming the influence of decrease in inherent viscosity, all set at the same polymerization rate and conversion, and the ethylene pressure was set such that copolymers having the same ethylene content would be obtained (Table 1 and FIG. 1).

As seen from Table 1, both with DMSO solvent and MeOH solvent, the ratio of decrease in inherent viscosity increases with increasing amount of solvent used. FIG. 1 shows that EVOH obtained with DMSO solvent has higher inherent viscosity than that with MeOH solvent of the same amount. In the bulk polymerization of Comparative Example 2, the inside temperature of the polymerization zone tended to elevate so that careful cooling operation was necessary.

Examples 6 through 8

Example 1 was repeated to conduct polymerization and saponification except for using 2,2'-azobis-2,4-dimethylvaleronitrile (AVN) as a polymerization initiator, changing the amount of DMSO used and employing a polymerization temperature of 40° C. Here also, as control, bulk polymerization (no solvent) and solution polymerization with MeOH solvent in the same compositions as with dimethyl sulfoxide solvent were conducted. The polymerization conditions were, for the purpose of confirming the influence of decrease in inherent viscosity, all set at the same polymerization rate and conversion, and the ethylene pressure was set such that copolymers having the same ethylene content would be obtained (Comparative Examples 7 through 10). The polymerization conditions and results are shown in Table 2. As is clear from comparison of Table 2 with Table 1, even under low polymerization temperature conditions the influence of the amount of DMSO solvent on the decrease in the inherent viscosity of the obtained EVOH is far smaller than that with MeOH solvent. Here also, like in Examples 1 through 5, with both of DMSO solvent and MeOH solvent, the polymerization proceeded always in a homogeneous liquid phase, which was confirmed by observation on samples of polymerization solution taken from time to time during the polymerization (Table 2).

Example 9

Polymerization was conducted in the same manner as in Example 1 using 639 g of vinyl acetate (VAc), 160 g of DMSO (DMSO/VAc=2/8 by weight) and 0.116% by weight based on the weight of VAc) of 2,2'-azobis-2,4-dimethylvaleronitrile (AVN) and at a reaction temperature of 50° C. under an ethylene pressure of 70 kg/cm²G. During the polymerization polymerization solution was sampled every 1 hour and the samples were, after addition of polymerization inhibitor, dried up by evaporation in an infra red drier, to check the solid content with time. The homogeneity of the reaction system was examined (uniformity of EVA concentration and checking of precipitated EVA). The homogeneous state was confirmed also by observation of the solution samples.

Figure 2:
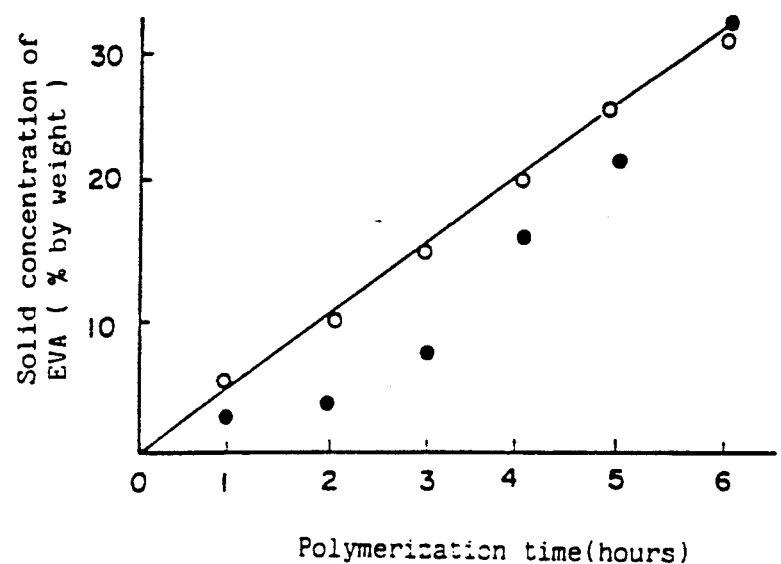
FIG. 2 is a graph with the abscissa showing the polymerization time (hours) (excluding induction period) and the ordinate showing the solid concentration of EVA (weight of EVA solid relative to that of polymerization solution) in solution samples taken during polymerization, in Example 9 and in the control described therein.

An EVA was obtained by polymerization under the above conditions and for 6 hours, in a conversion of 30%. The solution after the polymerization was subjected to saponification in the same manner as in Example 1 (NaOH/EVA=0.25 by moles, conducted twice), and after-treatments in the same manner, to obtain an EVOH having an ethylene content of 60 mol %, degree of saponification of 99.5% and an [η]inh of 0.088l/g. FIG. 2 shows how the solid content changed with time, i.e. linearly, which indicates that the polymerization proceeded always in a homogeneous state. The solution samples were transparent and uniform, with no pricipitated polymer.

As control, polymerization was conducted with a solvent of MeOH instead of DMSO, using 624 g of vinyl acetate, 156 g of MeOH, 0.118% by weight based on the weight of vinyl acetate of AVN and at a temperature of 50° C. under an ethylene pressure of 62.5 kg/cm²G. With this MeOH system also, same as with DMSO system, an EVA was obtained by 6 hours' polymerization in a conversion of 30%. The EVA was saponified in the same manner as in Example 9, to give an EVOH having an ethylene content of 60 mol %, a degree of saponification of 99.5% and an [η]inh of 0.075l/g. In the same manner as with the above DMSO system, the homogenity of the polymerization zone was studied by monitoring the change of solid content with time during the polymerization. The results are also shown in FIG. 2, which however gave no good linear relationship because of large dispersion of data starting already from the stage of low conversion. The solution samples for this measurement were turbid. These facts indicate that, in polymerization to obtain high-ethylene EVA, the use of DMSO as solvent can permit the polymerization to proceed always in a homogeneous state, contrary to the case when MeOH is used as solvent.

It is also understood that, also in polymerization to obtain high-ethylene EVA, the influence of the amount of DMSO solvent on the decrease in the inherent viscosity of the resulting EVOH is markedly lower than that with MeOH solvent.

Examples 10 and 11

Example 9 was repeated except for changing the amount of DMSO used, to conduct polymerization and saponification. As control, solution polymerization with MeOH solvent and bulk polymerization were also conducted (Comparative Examples 11 through 14). polymerization conditions were all set such that the same polymerization rate, conversion and ethylene content would be achieved. The homogeneity of the systems was studied by monitoring the change of solid content with time and state of solutions. The results are shown in Table 3.

As will be understood from Table 3, with DMSO solvent, polymerization proceeds always in a homogeneous state and gives a polymer the inherent viscosity of which has decreased only to a small extent, as compared with polymerization with MeOH solvent.

Example 12

Polymerization was conducted following the same procedure as in Example 1 with 1371 g of vinyl acetate, 343 g of DMSO and 0.018% (based on the weight of vinyl acetate) and at a reaction temperature of 60° C. and under an ethylene pressure of 3.5 kg/cm$^2$G for 4 hours, to obtain a polymer having an ethylene content of 5 mol % in a conversion of 40%. The polymer was saponified in the same manner as in Example 1 (NaOH-/EVA=0.1 by moles, conducted twice) to give an EVOH having an [η]inh of 0.236l/g. The solution samples taken during the polymerization were transparent and homogeneous, without precipitated polymer.

Example 13

The same EVA solution as that obtained in Example 1 was, after ethylene had been purged, transferred to a 3-liter separable flask. To the solution 1,360 g of DMSO was added, and residual monomer was distilled off at 50° C. under reduced pressure (not more than 100 mmHg). The mixture showed a viscosity of 10 poises just after the start of the distilling off and that of 15 poises when it finished. The amount of vinyl acetate in the distillate was monitored and, the distillation was stopped when the distillate became 100% DMSO. During and after the distillation, the state of the solution was homogeneous.

Example 2-1

A 5-liter separable flask equipped with a stirrer, a condenser, a thermometer and a nitrogen gas inlet was charged with 340 g of an EVA ([η]inh=0.224l/g), 660 g of MeOH and 1,700 g of DMSO, and the mixture was stirred with heating at 70° C. to form a homogeneous solution. To the obtained solution 51.6 g of 3% sodium hydroxide solution in MeOH was added and the mixture was subjected to reaction at 70° C. for 20 minutes. After the reaction the state of the solution was homogeneous part of the solution was sampled and the sample was neutralized and then subjected to repeated steps of precipitation from MeOH and washing. The solid matter obtained was pulverized and dried to give an EVOH having a degree of saponification of 97.8%. The saponification was further conducted for 20 minutes and from the resulting solution a mixture of MeOH and methyl acetate was, for the purpose of shifting the saponification equilibrium to the product side, distilled off by distillation under reduced pressure. When the distillate outside the zone amounted 780 g, the reaction was terminated by neutralization of the mixture. The mixture was then after-treated in the same manner as above to give an EVOH having a saponification degree of 99.9%. When the reaction was terminated, the solution showed a homogeneous state. Example 2-2

In a manner similar to that in Example 2-1, a mixture of 100 g of an EVA having an ethylene content of 32 mol % ([η]inh=0.111l/g), 170 g of MeOH and 580 g of DMSO was stirred with heating at 60° C. to give a homogeneous solution. To the solution 160 g of 3% sodium hydroxide solution in MeOH was added and the mixture was reacted at 60° C. for 30 minutes. After the reaction, the state of the solution was homogeneous. During reaction period, the reaction solution was sampled every hour and each of the samples was treated as follows. After being neutralized, the sample was added to 1 g/l acetic acid solution in pure water to precipitate the polymer, which was then immersed therein for 30 minutes. The aqueous acetic acid solution was replaced and the polymer was immersed therein for further 30 minutes. After decantation, the polymer was immersed in tap water for 30 minutes.

Figure 3:
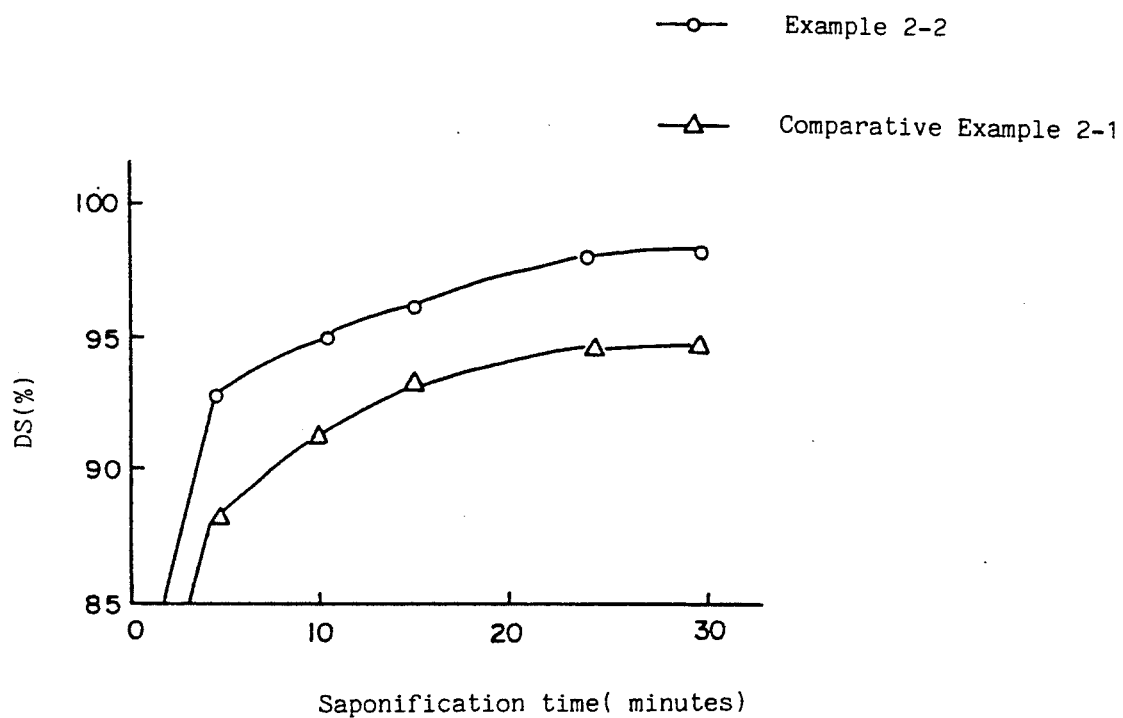
FIG. 3 is a graph with the abscissa showing the saponification time (minutes) and the ordinate showing the degree of saponification (DS) of EVOH in Example 2-2 and Comparative Example 2-1.

The polymer was then pulverized and dried to give EVOH. The relationships between the period of saponification and the degree of saponification is shown in FIG. 3. The degree of saponification was 75% after 2 minutes after the start of reaction, and the final saponification degree was 98.3%. From the solution obtained by the above reaction for 30 minutes, in the same manner as in Example 2-1, a mixture of MeOH and methyl acetate was distilled off by distillation in vacuo for the purpose of shifting the saponification equilibrium to the product side. When the distillate outside amounted 260 g, a solution sample was taken and treated in the same manner as above, to give a polymer, which showed a degree of saponification of 99.4%. To the reaction zone 190 g of MeOH was further added and the mixture was subjected to distillation in vacuo in the same manner. When the distillate amounted to 150 g, the reaction was terminated by neutralization and the reaction mixture was after-treated in the same manner to give an EVOH having a degree of saponification of 99.8%. The ratio by weight between MeOH and methyl acetate in the distillate just after the start of distillation was 1:9. During and after the reaction the solution was in a homogeneous liquid phase.

Comparative Example 2-1

Example 2-2 was repeated except for using MeOH in lieu of DMSO with the same ratio (molar ratio based on the moles of VAc component in EVA) of catalyst. The change of the degree of saponification with time Was, in the same manner as in the above Example, observed. The polymer showed a saponification degree of 55% after 2 minutes after the start of reaction and that of 95% after completion of the 30 minutes' reaction. The results are also shown in FIG. 3. As is apparent from FIG. 3, the presence of DMSO in combination can realize accelerated saponification, as compared with single solvent system of MeOH. From the solution obtained by the above reaction for 30 minutes a mixture of MeOH and methyl acetate was distilled off by distillation in vacuo. The ratio by weight between MeOH and methyl acetate in the distillate just after the start of distillation was 2:8. A solution sample taken when the distillate outside amounted 260 g was after-treated and tested for degree of saponification, which was 96.5%.

From comparison of the ratio by weight of MeOH and methyl acetate in the distillate of Example 2-1 and that of Comparative Example 2-1, it is understood that, when byproduct methyl acetate is distilled off to shift the saponification equilibrium to the product side, the presence of DMSO in combination in the reaction zone improves the separation efficiency of methyl acetate and MeOH, thereby achieving efficient distilling off of methyl acetate, as compared with the case with single MeOH system.

During and after the reaction, the solution was in a homogeneous state, same as the case with the DMSO-added system.

Example 2-3

In a manner similar to that in Example 2-1, a mixture of 100 g of an EVA having an ethylene content of 27 mol % ([$\eta$]inh=0.109l/g), 170 g of MeOH and 550 g of DMSO was stirred with heating at 60° C. to give a homogeneous solution.

To the solution 150 g of 3% sodium hydroxide solution in MeOH was added and the mixture was reacted at 60° C. for 30 minutes. During and after the reaction, the state of the solution was homogeneous. During reaction period, the reaction solution was sampled from time to time and treated in the same manner as in Example 2-1. The EVOH showed a degree of saponification of 77%, 2 minutes after the start of reaction, and a final saponification degree of 98.6%, 30 minutes after the start. From the solution obtained by the above reaction for 30 minutes, in the same manner as in Example 2-1, a mixture of MeOH and methyl acetate was distilled off by distillation in vacuo for the purpose of shifting the saponification equilibrium to the product side. When the distillate outside amounted 250 g, a solution sample was taken and after-treated to give a polymer, which showed a degree of saponification of 99.5%. To the reaction zone 190 g of MeOH was further added and the mixture was subjected to distillation in vacuo in the same manner. When the distillate amounted to 150 g, the reaction was terminated by neutralization and the reaction mixture was after-treated in the same manner to give an EVOH having a degree of saponification of 99.8%. During and after the reaction the solution was in a homogeneous liquid phase.

Comparative Example 2-2

Example 2-3 was repeated except for using MeOH instead of DMSO to conduct reaction with the same amount (molar ratio based on the moles of VAc component in EVA) of catalyst. Although the state of the solution was homogeneous when the reaction started, 5 minutes after the start EVOH started precipitation and solidified 10 minutes after the start. The solid was taken out after 30 minutes, pulverized in a mixer and after-treated to give an EVOH, which showed a saponification degree of 96.0%. The EVOH sample taken out 2 minutes after the start of reaction showed a saponification degree of 58%.

Example 2-4

In a manner similar to that in Example 2-1, a mixture of 100 g of an EVA having an ethylene content of 60 mol % ([$\eta$]inh=0.077l/g), 180 g of MeOH and 760 g of DMSO was stirred with heating at 60° C. to give a homogeneous solution. To the solution 260 g of 3% sodium hydroxide solution in MeOH was added and the mixture was reacted at 60° C. for 40 minutes. The EVOH obtained after the reaction showed a degree of saponification of 97.2%. From the solution obtained by the above reaction for 40 minutes, in the same manner as in Example 2-1, a mixture of MeOH and methyl acetate was distilled off by distillation in vacuo. When the distillate outside amounted 350 g, a solution sample was taken and after-treated to give a polymer, which showed a degree of saponification of 99.0%. To the reaction zone 200 g of MeOH was further added and the mixture was subjected to distillation in vacuo in the same manner. When the distillate amounted to 160 g, the reaction was terminated and the reaction mixture was after-treated to give an EVOH having a degree of saponification of 99.4%. During and after the reaction the solution was in a homogeneous liquid phase.

Comparative Example 2-3

Example 2-4 was repeated except for using MeOH instead of DMSO to conduct reaction with the same amount (molar ratio based on the moles of VAc component in EVA) of catalyst. At a temperature of 60° C., the polymer did not dissolve completely and the mixture remained turbid. After addition of the catalyst, the system became homogeneous and reaction was conducted for 40 minutes. The EVOH after being reacted for 40 minutes showed a saponification degree of 94.2%. Mixture of MeOH and methyl acetate was distilled off by distillation in vacuo. When the distillate outside amounted 350 g, a solution sample was taken and after-treated to give a polymer, which showed a degree of saponification of 95.6%. To the reaction zone 200 g of MeOH was further added and the mixture was subjected to distillation in vacuo such that a larger amount was distilled off than the system in Example 2-4 and where DMSO had been present in combination. When the distillate amounted to 200 g, the reaction was terminated and the reaction mixture was after-treated and tested for degree of saponification, which was 97.4%.

Example 2-5

In a manner similar to that in Example 2-2, there were used 100 g of an EVA having an ethylene content of 32 mol % ([$\eta$]inh=0.111l/g), 170 g of MeOH, 780 g of diethyl sulfoxide and 160 g of 3% sodium hydroxide in MeOH, to conduct reaction at 60° C. for 30 minutes. The sample taken after the 30 minutes' reaction showed a degree of saponifi-cation of 98.0%. After distillation to a distillate amounting 260 g, an EVOH having a saponification degree of 99.3% was obtained. After further addition of 190 g of MeOH and the succeeding distillation to a distillate of 150 g, an EVOH having a saponification degree of 99.6% was obtained. The ratio by weight between MeOH and methyl acetate in the distillate just after the start of distillation was 1:9. During and after the reaction the solution showed a homogenous state.

Example 2-6

In a manner similar to that in Example 2-2, there were used 100 g of an EVA having an ethylene content of 32 mol % ([$\eta$]inh=0.111l/g), 320 g of ethanol, 580 g of DMSO and 160 g of 3% sodium hydroxide in ethanol, to conduct reaction at 60° C. for 40 minutes. The sample taken after the 40 minutes' reaction showed a degree of saponification of 96.5%. After distillation to a distillate amounting 380 g, an EVOH having a saponification degree of 98.5% was obtained. After further addition of 270 g of ethanol and the succeeding distillation to a distillate of 220 g, an EVOH having a saponification degree of 99.5% was obtained. During and after the reaction the solution showed a homogenous state.

Example 3-1

A 5-liter separable flask equipped with a stirred, a reflux cooler, a catalyst liquid inlet and a sampling port was charged with 328 g (3.95 moles) of an EVA (ethylene content: 5 mol %, [η]inh=0.181l/g, 710 g (22.19 moles) of MeOH and 1,700 g of DMSO and the inside atmosphere of the flask was replaced by nitrogen gas. Temperature elevation was started with stirring in an oil bath and the EVA was dissolved at 60° C. Then, a catalyst solution of 1.58 g (0.0395 mole) of sodium hydroxide in 50 ml of MeOH was added at once under nitrogen gas atmosphere to start reaction, which was allowed to proceed at 60° C. for 30 minutes. After the 30 minutes, a sample was taken out and the EVOH formed and contained therein was tested for the degree of saponification, which was 97.8%. A reduced-pressure distillation apparatus was connected to the above reactor and further saponification of the polymer was conducted at a constant temperature of bottoms of 70° C. while byproduced methyl acetate and MeOH were being distilled off under normal or reduced pressure. The ratio by weight of methyl acetate/MeOH in the distillate just after the start of the byproducts was 9/1, which exceeds the azeotropic distillation composition of 8/2. The distillation was conducted over 1.5 hours under the above conditions and as a result 900 g of distillates was obtained in a dry ice-acetone cooling bath. At this time the EVOH in the bottoms had a saponification degree of 99.8%.

During the above reaction and the further saponification reaction the reaction zone maintained always a homogeneous state. To the bottoms after the further saponifications 2.37 g (0.0395 mole) of acetic acid was added to deactivate the catalyst. The concentration of EVOH in the bottoms was adjusted while the bottoms temperature was maintained at not higher than 90° C. under reduced pressure, to obtain a 17% solution of EVOH solution in DMSO.

The EVOH solution thus obtained was, as a spinning dope, fed to a dry-jet-wet spinning apparatus and extruded through a spinneret at a spinning head temperature of 80° C. into a coagulating bath of MeOH/DMSO=7/3 (by weight) at a bath temperature of 5° C. The extruded fiber was subjected to the succeeding treatment steps of removal by extraction with MeOH of remaining DMSO, wet heat drawing, drying and dry heat drawing, to give an EVOH fiber. The fiber had a strength and elongation of 15.2 g/d and 4.5% respectively and a hot water resistance of 130° C. as expressed by temperature of water in which the fiber under a constant load (200 mg/d) breaks.

Example 3-2

Example 3-1 was repeated except for using as EVA 317 g (3.95 moles) of one having an ethylene content of 10 mol % and an [η]inh of 0.271l/g to obtain a 7% solution in DMSO of an EVOH having a saponification degree of 99.7%. All through the procedures of saponification, further saponification, deactivation of catalyst and adjustment of concentration, the reaction system maintained a homogeneous state. The solution thus obtained was casted onto a polyethylene terephthalate film and the film was immersed in a MeOH coagulating bath at 10° C. to form the solution into film. The film was introduced in MeOH extraction bath, where DMSO was removed by extraction. The film was then air-dried at room temperature, stretched in one direction at 150° C. by 6 times and further heat fixed under constant length in an atmosphere of nitrogen gas at 190° C. for 3 minutes, to give an EVOH film having a thickness of 24 μm containing almost no gels or irregular matter.

Example 3-3

Example 3-1 was repeated except for using as EVA 266 g (3.95 moles) of one having an ethylene content of 32 mol % and an [η]inh of 0.106l/g and 7.9 g (0.198 mole) of sodium hydroxide as a saponification catalyst, to obtain a 25% solution in DMSO of an EVOH having a saponification degree of 99.5%. All through the procedures of saponification, further saponification, deactivation of catalyst and adjustment of concentration, the reaction system maintained a homogeneous state. The solution thus obtained was heated to a temperature of 70° C. and then extruded through a slit of a sheet forming machine into a cooling water kept at a temperature of 3° C, coagulated therein, to form a white opaque sheet-shaped wet gel having a thickness of 600 μm. The gel thus obtained was immersed in water at 65° C. for 3 minutes and dried at 40° C. for 60 minutes, to give a sheet having a thickness of 480 μm.

Example 3-4

Example 3-1 was repeated except for using 1,021 g (22.2 moles) of ethanol instead of MeOH, 1,700 g of diethyl sulfoxide instead of DMSO and 4.43 g (0.079 mole) of potassium hydroxide instead of sodium hydroxide, to obtain a 15% solution in diethyl sulfoxide of an EVOH having a saponification degree of 99.6%. All through the procedures of saponification, further saponification, deactivation of catalyst and adjustment of concentration, the reaction system maintained a homogeneous state. The solution thus obtained was, as a spinning dope, fed to a spinning apparatus of wet flow-up system and extruded through a spinneret at a head temperature of 60° C. into a coagulating bath of ethanol/diethyl sulfoxide of 4/1 by weight at a bath temperature of 5° C. The extruded fiber was then subjected to the succeeding steps of removal by extraction with ethanol of diethyl sulfoxide, wet heat drawing, drying and dry heat drawing, to give an EVOH fiber. The fiber had a strength and elongation of 14.9 g/d and 4.8%, respectively.

Example 3-5

Example 3-1 was repeated except for using as EVA 261 g (3.90 moles) of one having an ethylene content of 33 mol % and an [η]inh of 0.148l/g and 7.9 g (0.198 mole) of sodium hydroxide as a saponification catalyst, to obtain a 13% solution in DMSO of an EVOH having a saponification degree of 99.8%. All through the procedures of saponification, further saponification, deactivation of catalyst by equimolar addition of acetic acid and adjustment of concentration, the reaction system maintained a homogeneous state and no deposit of gels or the like on the reactor wall was observed. The solution thus obtained was, as spinning dope, extruded through a ring nozzle of a wet hollow-fiber manufacturing apparatus with an inside injection agent of nitrogen into a coagulating bath of 30% by weight aqueous DMSO solution kept at −7° C. and at a nozzle draft of 1.5, to give an EVOH hollow fiber. The fiber was then wet heat-treated at 40° C. for 6 minutes, washed with water and then with acetone and dried, to give a finished follow fiber having a water permeability of 6 ml/mmHg·hr/m$^2$.

Example 3-6

Example 3-1 was repeated except for using as EVA 174 g (4.0 moles) of one having an ethylene content of 70 mol % and an [η]inh of 0.078l/g, 384 g (12.0 moles) of MeOH and 1,700 9 of DMSO and 16 g (0.4 mole) of sodium hydroxide as a saponification catalyst, and repeating further saponification by addition of 256 g (8.0 moles) of MeOH after having distilled off methyl acetate/MeOH by the first further saponification, to obtain a 12% solution of an EVOH having a saponification degree of 99.5% in DMSO. All through the procedures of methanolysis, first and second further saponification, deactivation of catalyst by equimolar addition of acetic acid and adjustment of concentration, the reaction system maintained a homogeneous state and no deposit of gels or the like was observed. The solution of EVOH thus obtained was fed to a pulverizing apparatus provided with a vibration nozzle having a diameter of 0.6 mm and pulverized therein with a coagulating bath of water at 20° C. under vibration at 70 Herz into spherical gels having an average particle diameter of 1.5 mm. The spherical gels were then washed with water and dried to give a spherical polymer having an average particle diameter of 0.55 mm and an average ratio of maximum width/maximum length of 0.9 and having a sharp particle size distribution.

Comparative Example 3-1

An attempt was made to conduct methanolysis in the same manner as in Example 3-1, with 344 g (4.0 moles) of a polyvinyl acetate having an [μ]inh of 0.186l/g instead of EVA and 2,400 g of MeOH but without addition of DMSO. Just after the start of methanolysis, the reaction system became heterogeneous so that reaction in a homogeneous state was impossible.

Comparative Example 3-2

An attempt was made to conduct methanolysis in the same manner as in Example 3-1, using as EVA 135 g (4.0 moles) of one having an ethylene content of 90 mol % and an [μ]inh of 0.0678l/g. The copolymer dissolved in the reaction zone only insufficiently. Methanolysis was conducted with the heterogeneous state as it is for 2 hours. The reaction system remained heterogeneous. The polymer obtained after the reaction showed a saponification degree of only 52%.

Example 4-1

A 5-liter autoclave equipped with a electromagnetic stirrer and a sampling port was charged with 2.74 kg (31.86 moles) of vinyl acetate (VAc), 0.69 kg of DMSO (VAc/DMSO=4/1 by weight) and 0.159 g of azobisisobutyronitrile (0.0058% by weight based on the weight of VAc). The inside atmosphere was thoroughly replaced with ethylene gas and the contents were pressurized by a pressure adjusting apparatus to an ethylene pressure of 3 kg/cm$^2$. With the ethylene pressure being maintained at this level, the temperature was elevated up to 60° C. and copolymerization of ethylene and vinyl acetate was started under the constant temperature condition of 60° C. The polymerization was allowed to proceed for 5 hours, while the reaction process was being monitored by sampling. The polymerization system remained homogeneous solution over all the reaction period and conversion after 5 hours was 30%.

The EVA sampled from the solution showed an ethylene content of 5 mol % and an [η]inh as measured on EVOH after saponification of 0.247l/g. To the polymerization solution a polymerization inhibitor was added and the mixture was introduced into a 10-liter separable flask equipped with a stirrer, a reduced-pressure distillation apparatus, a catalyst liquid inlet and a sampling port under an atmosphere of nitrogen. Thereafter, 3,700 g of DMSO was added and the inside temperature was elevated with an oil bath and with stirring up to 60° C. Distilling off of residual VAc was conducted under the constant bottoms temperature condition of 60° C. while the degree of reduced pressure was gradually changed (50 mmHg to 5 mmHg). The solution had a viscosity of 11 poises just after start of the distilling off and that of 19 poises when finished. By collecting of 2 kg of the distillate, it was confirmed that the residual VAc in the bottoms had become 0.02%. This operation of distilling off was able to be conducted in the state of a homogeneous solution. Next, to the bottoms maintained at a temperature of 60° C, 1,700 g (53.13 moles) of MeOH, and to the mixture a catalyst solution of 3.82 g (0.096 mole) of sodium hydroxide in 100 ml of MeOH was added at once under an atmosphere of nitrogen, to start reaction, which continued at 60° C. over 30 minutes. The EVOH sampled after the 30 minutes' reaction had a saponification degree of 97.8%. A reduced-pressure distillation apparatus was attached to the above reactor and further saponification of EVOH was conducted at a constant bottoms temperature of 70° C. while byproduced methyl acetate and MeOH were being distilled off under normal or reduced pressure. The ratio by weight of methyl acetate/MeOH in the distillate just after the start of the distillation was 9/1, which exceeded the azeotropic distillation composition of methyl acetate/MeOH of 8/2. The distilling off was conducted over 1.5 hours under the above condition, whereby 2,250 g of distillate was collected in a dry ice-acetone cooling bath. The EVOH in the bottoms had a saponification degree of 99.8%.

During the above reaction and the further saponification reaction the reaction zone always maintained a homogeneous state. To the bottoms after the further saponification, 5.76 g (0.096 mole) of acetic acid was added to deactivate the catalyst. The concentration of EVOH in the bottoms was adjusted while the bottoms temperature was maintained at not higher than 90° C. under reduced pressure, to obtain a 12% by weight solution of EVOH solution in DMSO.

The EVOH solution thus obtained was, as a spinning dope, fed to a dry-jet-wet spinning apparatus and extruded through a spinneret at a spinning head temperature of 80° C. into a coagulating bath of MeOH/DMSO=7/3 (by weight) at a bath temperature of 5 C. The extruded fiber was subjected to the succeeding treatment steps of removal by extraction with MeOH of remaining DMSO, wet heat drawing, drying and dry heat drawing, to give an EVOH fiber. The fiber had a strength and elongation of 16.5 g/d and 4.7% respectively and a hot water resistance of 135° C. as expressed by temperature of water in which the fiber under a constant load (200 mg/d) breaks.

Example 4-2

Example 4-1 was repeated except for changing the amount of azobisisobutyronitrile added to the polymerization zone to 0.225 g (0.0082% by weight based on the weight of VAc) and using an ethylene pressure of 7 kg/cm², to obtain in a conversion of 31% an EVA having an ethylene content of 10 mol % and an [η]inh as measured on the corresponding EVOH of 0.210l/g. The residual VAc was distilled off from the solution in the same manner as in Example 4-1 and final residual VAc amount was confirmed to be not more than 0.02%. The solution had a viscosity of 9 poises just after the start of the distilling off, and that of 15 poises when it finished. All through the above procedure the system always maintained a homogeneous state. Saponification, further saponification and adjustment of solution concentration were conducted in the same manner as in Example 4-1, to obtain a 6% by weight solution in DMSO of an EVOH having a saponification degree of 99.7%.

All through the above procedure, the reaction system maintained a homogeneous state. The solution thus obtained was casted onto a polyethylene terephthalate film and the film was immersed in a MeOH coagulating bath at 10° C. to form the solution into film. The film was introduced in MeOH extraction bath, where DMSO was removed by extraction. The film was then air-dried at room temperature, stretched monoaxially at 150° C. by 6 times and further heat fixed under constant length in an atmosphere of nitrogen gas at 190° C. for 3 minutes, to give an EVOH film having a thickness of 20 μm containing almost no gels or irregular matter.

Example 4-3

Example 4-1 was repeated except for changing the amount of azobisisobutyronitrile to the polymerization zone to 1.10 g (0.04% by weight based on the weight of VAc) and using an ethylene pressure of 43 kg/cm², to obtain in a conversion of 30% of an EVA having an ethylene content of 32 mol % and an [η]inh as measured on the corresponding EVOH of 0.119l/g. The residual VAc was distilled off from the solution in the same manner as in Example 4-1 and final residual VAc amount was confirmed to be not more than 0.02%. The solution had a viscosity of 5 poises just after the start of the distilling off, and that of 7 poises when it finished.

All through the above procedure the system always maintained a homogeneous state. Saponification with 19.1 g (0.48 mole) of sodium hydroxide as a saponification catalyst, further saponification and adjustment of solution concentration were conducted in the same manner as in Example 4-1, to obtain a 21% solution in DMSO of an EVOH having a saponification degree of 99.5%. All through the above procedures, the reaction system maintained a homogeneous state.

The solution thus obtained was heated to a temperature of 70° C. and then extruded through a slit of a sheet forming machine into a cooling water kept at a temperature of 3° C., coagulated therein, to form a white opaque sheet-shaped wet gel having a thickness of 600 μm. The gel thus obtained was immersed in water at 65° C. for 3 minutes and dried at 40° C. for 60 minutes, to give a sheet having a thickness of 450 μm.

Example 4-4

The procedures of copolymerization, distilling off of residual VAc, saponification and further saponification were conducted in the same manner as in Example 4-1 and adjustment of solution concentration was so conducted as to obtain a 10% solution in DMSO of an EVOH having a saponification degree of 99.8%. The solution thus obtained was, as a spinning dope, fed to a spinning apparatus of wet flow-up system and extruded through a spinneret at a head temperature of 60° C. into a coagulating bath of MeOH/DMSO of 4/1 by weight at a bath temperature of 5° C. The extruded fiber was then subjected to the succeeding steps of removal by extraction with MeOH of DMSO, wet heat drawing, drying and dry heat drawing, to give an EVOH fiber. The fiber had a strength and elongation of 16.2 g/d and 4.9%, respectively.

Example 4-5

Example 4-1 was repeated except for changing the amount of azobisisobutyronitrile to the polymerization zone to 2.33 g (0.085% by weight based on the weight of VAc) and using an ethylene pressure of 32 kg/cm², to obtain in a conversion of 20% a solution of an EVA having an ethylene content of 32 mol % and an [η]inh as measured on the corresponding EVOH of 0.143l/g. The residual VAc was distilled off from the solution in the same manner as in Example 4-1 and final residual VAc amount was confirmed to be not more than 0.02%.

All through the above procedures, the reaction system maintained a homogeneous state. Saponification with 26.9 g (0.67 mole) of sodium hydroxide as a saponification catalyst, further saponification and adjustment of solution concentration were conducted in the same manner as in Example 4-1, to obtain a 12% solution in DMSO of an EVOH having a saponification degree of 99.6%. All through the above procedures, the reaction system maintained a homogeneous state and no deposit of gels or the like on the reactor wall was observed.

The solution thus obtained was, as spinning dope, extruded through a ring nozzle of a wet hollow-fiber manufacturing apparatus with an inside injection agent of nitrogen into a coagulating bath of 30% by weight aqueous DMSO solution kept at −7° C. and at a nozzle draft of 1.5, to give an EVOH hollow fiber. The fiber was then wet heat-treated at 40° C. for 6 minutes, washed with water and then with acetone and dried, to give a finished follow fiber having a water permeability of 6.3 ml/mmHg·hr/m².

Example 4-6

Example 4-1 was repeated except for using 1,800 g (20.93 moles) of vinyl acetate, 1,200 g of DMSO (VAc/DMSO=6/4 by weight) and 2.36 g (0.131% by weight based on the weight of VAc) of azobisisobutyronitrile and using an ethylene pressure of 65 kg/cm:, to obtain in a conversion of 30% a solution of an EVA having an ethylene content of 60 mol % and an [η]inh as measured on the corresponding EVOH of 0.085l/g. The polymerization zone always maintained a homogeneous state. The residual VAc was distilled off from the solution while 4,800 g of DMSO was added, in the same manner as in Example 4-1, during which the reaction system maintained a homogeneous state.

Saponification was conducted by addition of 1,500 g (47.1 moles) of MeOH and 31.4 g (0.79 mole) of sodium hydroxide, and further saponification was conducted to distill off methyl acetate/MeOH. Thereafter, once again further saponification was conducted by addition of 973 g (30.4 moles) of MeOH. Then, deactivation of catalyst by addition of acetic acid in an amount of the same moles as that of the sodium hydroxide fed and adjustment of solution concentration were conducted in the same manner as in Example 4-1, to obtain a 11.5% solution in DMSO of an EVOH having a saponification degree of 99.6%. All through the above procedures, the reaction system maintained a homogeneous state. The solution of the EVOH was fed to a pulverizing apparatus provided with a vibration nozzle having a diameter of 0.6 mm and pulverized therein with a coagulating bath of water at 20° C. under vibration at 65 Herz into spherical gels having an average particle diameter of 1.5 mm. The spherical gels were then washed with water and dried to give a spherical polymer having an average particle diameter of 0.55 mm and an average ratio of maximum width/maximum length of 0.9 and having a sharp particle size distribution.

Comparative Example 4-1

Example 4-1 was repeated except for using instead of DMSO 0.69 kg of MeOH (VAc/MeOH=4/1 by weight) and 0.39 g (0.014% by weight based on the weight of VAc) of azobisisobutyronitrile and without ethylene, to conduct homopolymerization of vinyl acetate for 5 hours. The conversion was 50% and the obtained polymer showed an $[\eta]$inh of 0.210 l/g as measured on the corresponding polyvinyl alcohol. Remaining VAc was distilled by adding 3.5 kg of MeOH instead of DMSO and under normal pressure, to obtain a 35% by weight solution of polyvinyl acetate in MeOH. All through the above procedures, the system showed a homogeneous state. Saponification was started under the same conditions as in Example 4-1 by adding 6.4 g (0.16 mole) of sodium hydroxide to the above solution of polyvinyl acetate in MeOH. Just after the start of the saponification, the reaction system became heterogeneous and the reaction in a homogeneous state was impossible.

Comparative Example 4-2

Example 4-1 was repeated except for using instead of DMSO 0.69 kg of MeOH (VAc/MeOH=4/1 by weight) and 3.23 g of azobisisobutyronitrile (0.118% by weight based on the weight of VAc) and using an ethylene pressure of 62.5 kg/cm$^2$ and a polymerization temperature of 50° C., to conduct polymerization. Samples taken from the polymerization were opaque and the system was observed to be in a heterogeneous state. The conversion after 6 hours was 30% and the obtained polymer had an ethylene content of 60 mol % and an $[\eta]$inh of 0.0749 l/g as measured on the corresponding EVOH. Remaining VAc was distilled by adding to the thus obtained solution 3.0 kg of MeOH instead of DMSO and under normal pressure in the same manner as in Example 4-1. The bottoms became more turbid as VAc was being distilled off and there was observed precipitates of EVA, so that it was difficult to distill off VAc in a homogeneous state.

Examples 5-1 through 5-4

EVA's having an ethylene content of 0 (pVAc), 20, 32, 47 and 60 mol %, respectively, were saponified, in the same manner as in Example 2-1, under conditions as shown in Table 4 and at 40° C. for 60 minutes. The polymers were each precipitated by adding a solvent appropriately selected, depending on the ethylene content and saponification of the polymer, from water, MeOH or mixed solvent of the two. After the reaction, the solutions were all homogenous.

Figure 4:
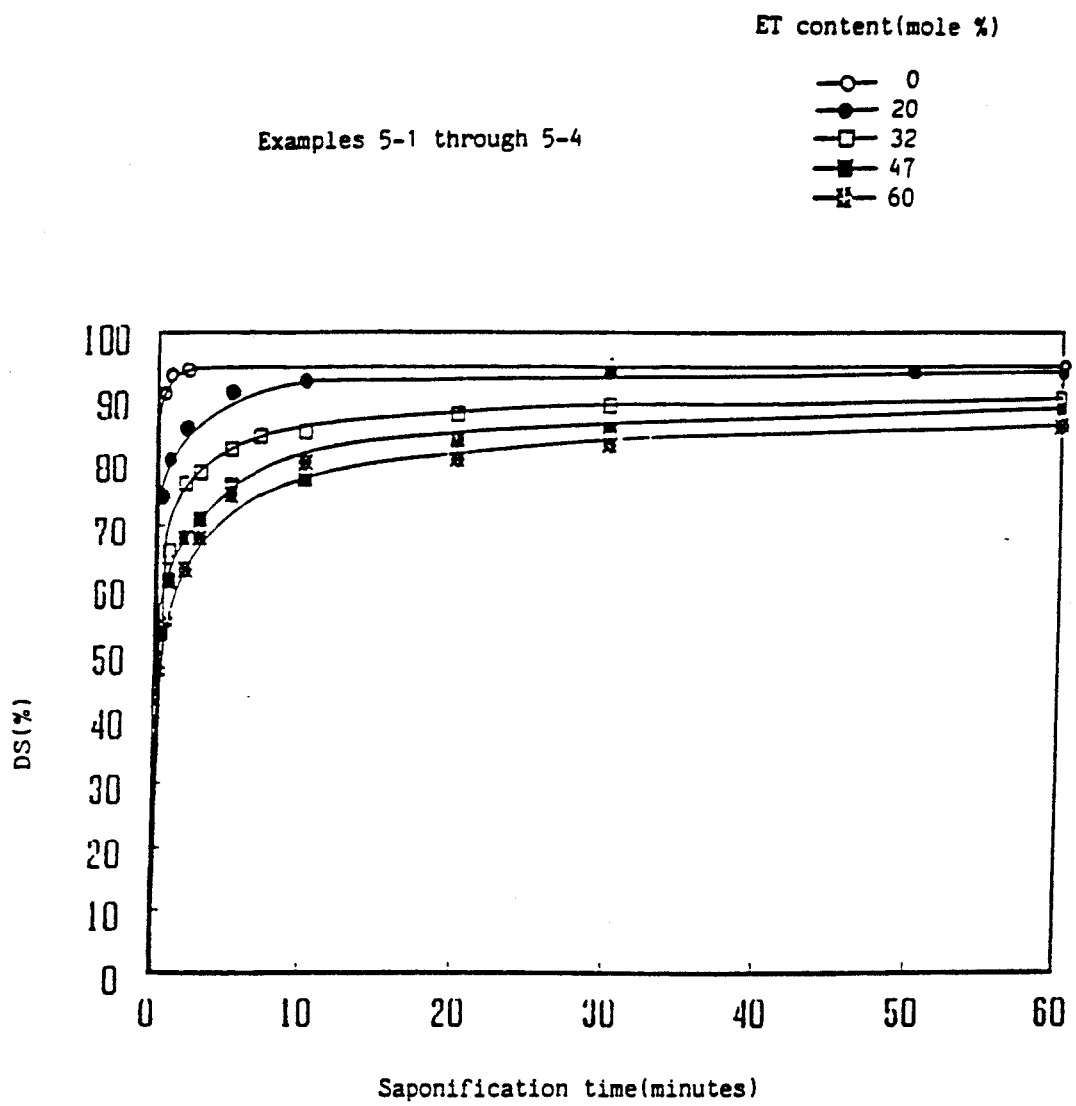
FIG. 4 is a graph with the abscissa showing the saponification time (minutes) and the ordinate showing the DS of EVOH, in Examples 5-1 through 5-4.

FIG. 4 shows the change of the saponification degree with time.

As control, Example 5-1 was repeated except for using MeOH instead of DMSO, to conduct saponification. The polymers obtained after the reaction were pulverized, neutralized and then subjected to aftertreatment (Comparative Examples 5-1 through 5-5).

With the MeOH system, the reaction mixtures were solid or slurry, differing depending on the ethylene content though.

Figure 5:
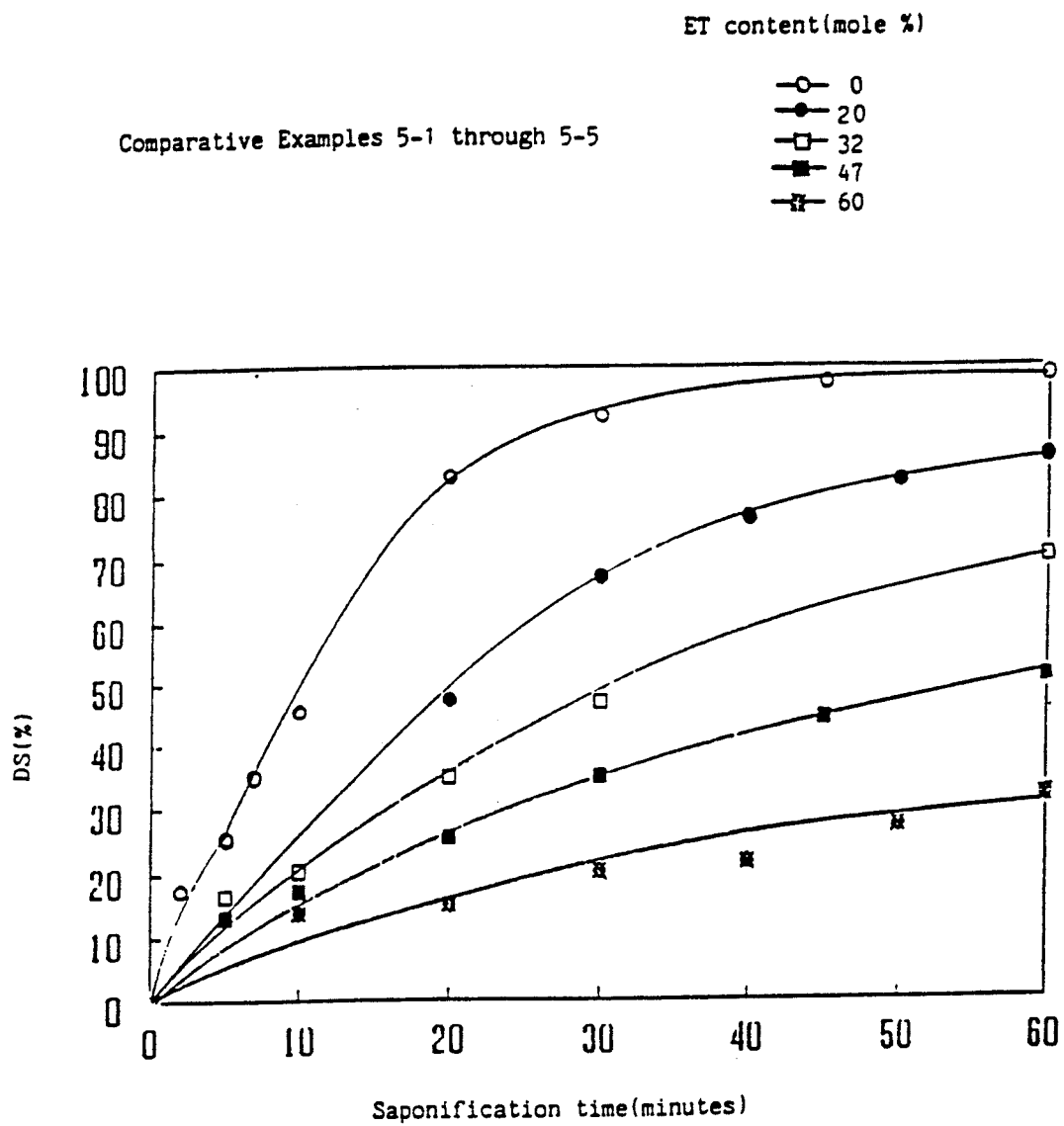
FIG. 5 is a graph with the abscissa showing the saponification time (minutes) and the ordinate showing the DS of EVOH, in Comparative Examples 5-1 through 5-5.

FIG. 5 shows the change of the saponification degree with time in these MeOH systems.

As is apparent from comparison of FIG. 4 with FIG. 5, with DMSO solvent system the reaction proceeds much faster than with MeOH system.

Figure 6:
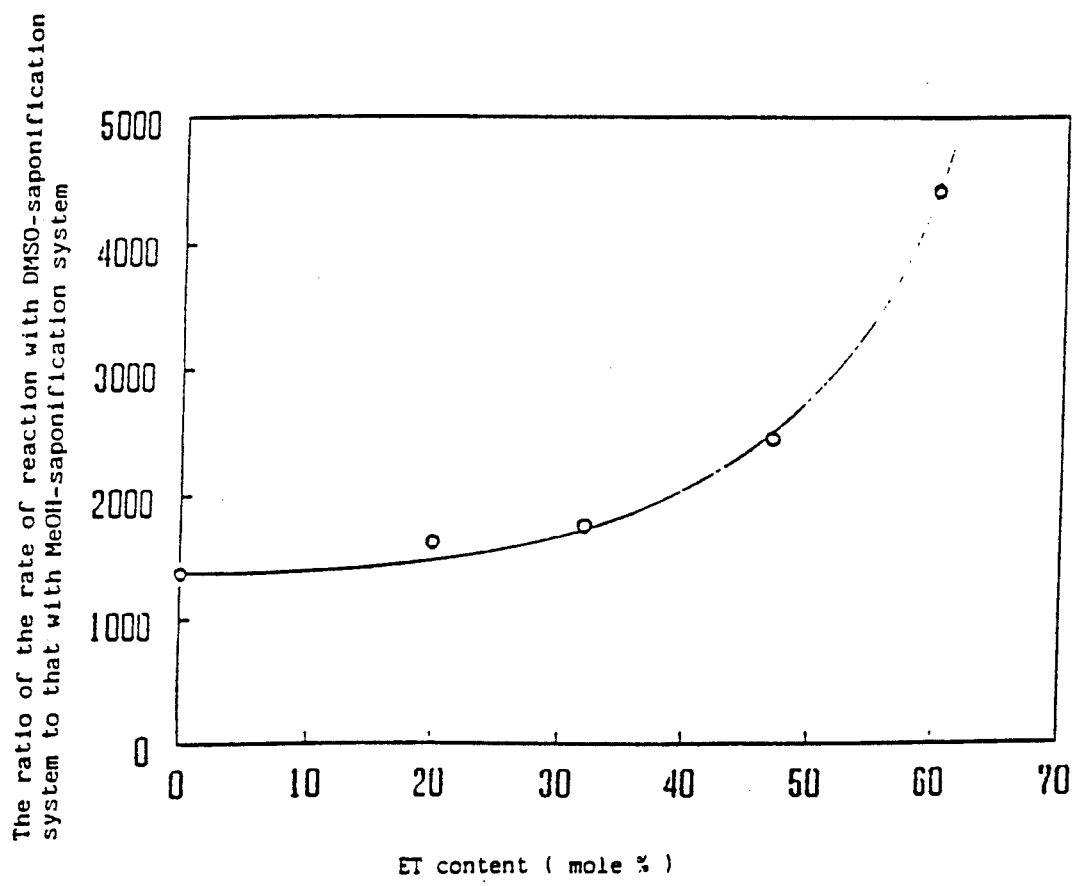
FIG. 6 is a graph with the abscissa showing the ethylene (ET) content and the ordinate showing the ratio of the rate of reaction with DMSO- saponification system to that with MeOH-saponification system in Examples 5-1 through 5-4 and Comparative Examples 5-1 through 5-5.

The rate of reaction corresponding to each of the ethylene contents and with each solvent system was calculated from FIGS. 4 and 5, and the ratio of the rate with DMSO-saponification system to that with MeOH-saponification system was obtained (FIG. 6). As understood from FIG. 6, the rate ratio increases with increasing ethylene content, which means that the saponification reaction with DMSO is very specific.

Examples 6-1 through 6-5

Polymerization was conducted in a manner similar to that in Example 1 by feeding the same amounts of DMSO and vinyl acetate (DMSO/VAc=5/5 by weight) and varying the ethylene pressure, while the amount of the initiator was so adjusted as to realize the same polymerization rate and conversion. The EVA's obtained were saponified in the same manner as in Example 1 and the obtained EVOH's (saponification degree: 99.4 to 99.7%) were tested for inherent viscosity.

Figure 7:
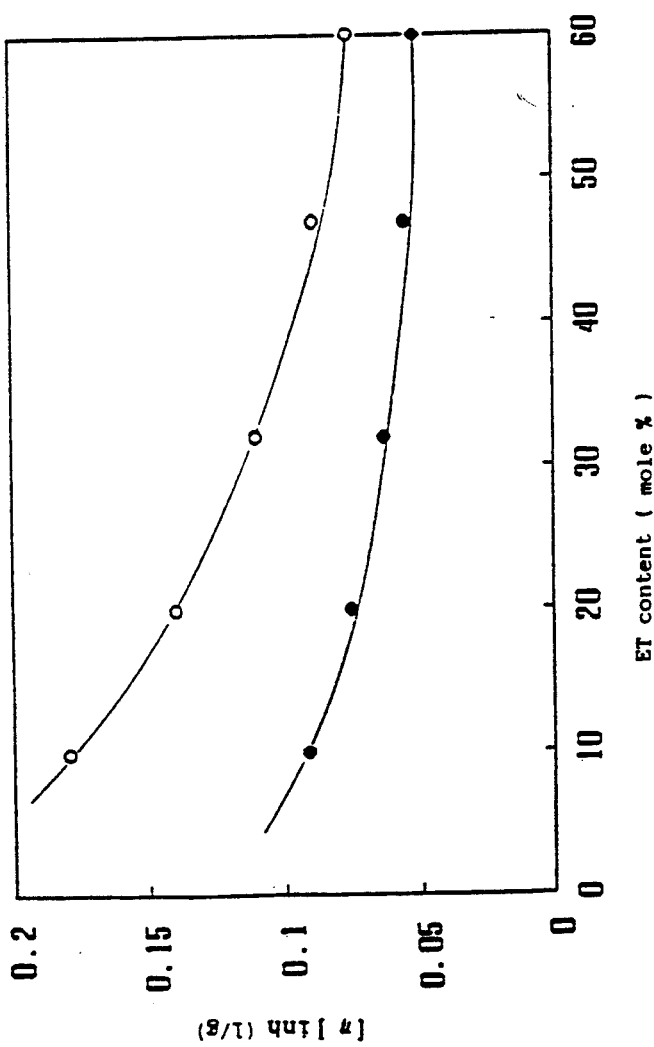
FIG. 7 is a graph with the abscissa showing the ethylene (ET) content and the coordinate showing the [$\eta$] of EVOH, Examples 6-1 through 6-5 and Comparative Examples 6-1 through 6-5.

As control, polymerization was conducted in MeOH systems without DMSO and in the same compositions as in the above DMSO system (Comparative Examples 6-1 through 6-5). Here, the ethylene pressure for each reaction was set such that the same polymerization rate, conversion and ethylene content would be realized (Table 5 and FIG. 7). As seen from FIG. 7, EVOH's obtained by solution polymerization with DMSO solvent have higher inherent viscosity than those obtained with MeOH solvent system.

Example 7-1

The procedure of Example 3-1 was followed with 100 g of EVA having an ethylene content of 32 mol % and $[\eta]$inh of 0.111 l/g, 96 g of MeOH and 1,788 g of DMSO and using 2.0 g of sodium hydroxide as saponification catalyst, to effect reaction at 40° C. for 2 minutes. Then the same after-treatment as in Example 3-1 was conducted to obtain a partially saponified EVOH having a saponification degree of 76.5%, a melting point of 116.4° C. and a block character of 0.345.

As control (Comparative Example 7-1), Example 7 was repeated except for using MeOH instead of DMSO, to effect reaction at 40° C. for 90 minutes, followed by same after-treatment, to obtain a partially saponified EVOH having a saponification degree of 76.5%, melting point of 143.8° C. and a block character of 0.118.

The above facts show that saponification in DMSO solvent gives EVOH with the same saponification degree but having lower melting point than that obtained with MeOH solvent, and that the former (DMSO-saponification system) has sharper distribution of remaining acetyl groups, i.e. more randomized distribution, than the latter (MeOH-saponification system).

As stated heretofore, the processes of the present invention produce the following effects.

Ethylene-vinyl ester copolymers having a wide range of ethylene content can be obtained. Since the polymerization zone is maintained in a substantially homogeneous liquid phase, the resulting EVA and further EVOH obtainable therefrom both have uniform properties and residual monomer can readily be recovered. Furthermore, there can be obtained EVA with higher polymerization degree than that with solution polymerization using MeOH.

Obviously, numerous modifications and variations of the invention are possible in light of the above teachings. It is therefore understood that within the scope of the appended claims, the invention may be practiced otherwise than as specifically described herein.

TABLE 1

| Example or Comparative Example | | VAc (g) | Solvent (g) | VAc/solvent (ratio by weight) | AIBN (wt % based on the weight of VAc) | Ethylene pressure (kg/cm²G) | polymerization time (hr) | Conversion (%) | Intrinsic viscosity of EVOH (l/g) |
|---|---|---|---|---|---|---|---|---|---|
| Example | 2 | 1088 | 121 | 9/1 | 0.023 | 45 | 5 | 50 | 0.122 |
| " | 3 | 924 | 396 | 7/3 | 0.027 | 41 | 5 | 50 | 0.177 |
| " | 4 | 727 | 727 | 5/5 | 0.035 | 35 | 5 | 50 | 0.110 |
| " | 5 | 182 | 1640 | 1/9 | 0.138 | 10 | 5 | 50 | 0.064 |
| Comparative | | | | | | | | | |
| Example | 2 | 1160 | 0 | 10/0 | 0.022 | 48 | 5 | 50 | 0.124 |
| " | 3 | 1068 | 119 | 9/1 | 0.094 | 44 | 5 | 50 | 0.109 |
| " | 4 | 871 | 373 | 7/3 | 0.116 | 38 | 5 | 50 | 0.085 |
| " | 5 | 654 | 654 | 5/5 | 0.154 | 32 | 5 | 50 | 0.063 |
| " | 6 | 146 | 1312 | 1/9 | 0.692 | 7 | 5 | 50 | 0.019 |

*Ethylene content of EVOH = 32 mol %

TABLE 2

| Example or Comparative Example | | VAc (g) | Solvent (g) | VAc/solvent (ratio by weight) | AVN (wt % based on the weight of VAc) | Ethylene pressure (kg/cm²G) | polymerization time (hr) | Conversion (%) | Intrinsic viscosity of EVOH (l/g) |
|---|---|---|---|---|---|---|---|---|---|
| Example | 6 | 1070 | 268 | 8/2 | 0.085 | 32 | 5 | 20 | 0.143 |
| " | 7 | 763 | 763 | 5/5 | 0.119 | 26 | 5 | 20 | 0.130 |
| " | 8 | 505 | 1179 | 3/7 | 0.180 | 12 | 5 | 20 | 0.113 |
| Comparative | | | | | | | | | |
| Example | 7 | 1236 | 0 | 10/0 | 0.073 | 36 | 5 | 20 | 0.148 |
| " | 8 | 1029 | 257 | 8/2 | 0.133 | 28 | 5 | 20 | 0.120 |
| " | 9 | 686 | 686 | 5/5 | 0.199 | 20 | 5 | 20 | 0.082 |
| " | 10 | 430 | 1004 | 3/7 | 0.317 | 7 | 5 | 20 | 0.056 |

*Ethylene content of EVOH = 32 mol %

TABLE 3

| Example or Comparative Example | | VAc (g) | Solvent (g) | VAc/solvent (ratio by weight) | AVN (wt % based on the weight of VAc) | Ethylene pressure (kg/cm²G) | Intrinsic viscosity of EVOH (l/g) | Uniformity of polymerization zone |
|---|---|---|---|---|---|---|---|---|
| Example | 10 | 670 | 74 | 9/1 | 0.110 | 74 | 0.089 | ○ |
| " | 9 | 639 | 160 | 8/2 | 0.116 | 70 | 0.088 | ○ |
| " | 11 | 563 | 376 | 6/4 | 0.131 | 65 | 0.085 | ○ |
| Comparative | | | | | | | | |
| Example | 11 | 696 | 0 | 10/0 | 0.106 | 79 | 0.090 | ○ |
| " | 12 | 662 | 74 | 9/1 | 0.112 | 64 | 0.084 | X |
| " | 13 | 624 | 156 | 8/2 | 0.118 | 62.5 | 0.078 | X |
| " | 14 | 533 | 355 | 6/4 | 0.139 | 58 | 0.066 | X |

*Ethylene content of EVOH = amol %
*Polymerization time: 6 hrs; conversion: 30%
*Uniformity of polymerization system is expressed as: ○: uniform X: non-uniform

TABLE 4

| Example or Comparative Example | Solvent | EVA Ethylene content (mol %) | [η] inh (l/g) | Saponification conditions | | | |
|---|---|---|---|---|---|---|---|
| | | | | Concentration of EVA (wt %) | NaOH/VAc (molar ratio) | MeOH/VAc (molar ratio) | DMSO/VAc (molar ratio) |
| (Control) | DMSO | 0 | 0.197 | 5 | 0.05 | 3 | 19.7 |
| Example 5-1 | DMSO | 20 | 0.120 | 5 | 0.05 | 3 | 21.1 |
| Example 5-2 | DMSO | 32 | 0.111 | 5 | 0.05 | 3 | 22.9 |
| Example 5-3 | DMSO | 47 | 0.081 | 5 | 0.05 | 3 | 25.7 |
| Example 5-4 | DMSO | 60 | 0.077 | 5 | 0.05 | 3 | 29.9 |
| Comparative Example 5-1 | MeOH | 0 | 0.197 | 5 | 0.05 | 51.0 | 0 |
| Comparative Example 5-2 | MeOH | 20 | 0.120 | 5 | 0.05 | 55.2 | 0 |
| Comparative Example 5-3 | MeOH | 32 | 0.111 | 5 | 0.05 | 59.3 | 0 |
| Comparative Example 5-4 | MeOH | 47 | 0.081 | 5 | 0.05 | 65.8 | 0 |

TABLE 4-continued

| Example or Comparative Example | Solvent | EVA Ethylene content (mol %) | [η] inh (l/g) | Saponification conditions | | | |
|---|---|---|---|---|---|---|---|
| | | | | Concentration of EVA (wt %) | NaOH/VAc (molar ratio) | MeOH/VAc (molar ratio) | DMSO/VAc (molar ratio) |
| Comparative Example 5-5 | MeOH | 60 | 0.077 | 5 | 0.05 | 75.9 | 0 |

Note: All the above reactions were conducted at a temperature of 40° C.

TABLE 5

| Example or Comparative Example | Solvent | Ethylene content (mol %) | Inherent viscosity of EVOH (l/g) |
|---|---|---|---|
| Example 6-1 | DMSO | 10 | 0.179 |
| Example 6-2 | DMSO | 20 | 0.139 |
| Example 6-3 | DMSO | 32 | 0.110 |
| Example 6-4 | DMSO | 47 | 0.088 |
| Example 6-5 | DMSO | 60 | 0.075 |
| Comparative Example 6-1 | MeOH | 10 | 0.091 |
| Comparative Example 6-2 | MeOH | 20 | 0.075 |
| Comparative Example 6-3 | MeOH | 32 | 0.063 |
| Comparative Example 6-4 | MeOH | 47 | 0.055 |
| Comparative Example 6-5 | MeOH | 60 | 0.051 |

Polymerization conditions
Temperature: 60° C.
Time: 5 hours
Conversion: 50%
The ethylene pressure and the amount of initiator were adjusted to obtain the above values.

What is claimed is:

1. A process for producing ethylene-vinyl alcohol copolymer by saponification of an ethylene-vinyl ester copolymer, comprising saponifying ethylene-vinyl ester copolymer having an ethylene content ranging from about 0.1 to 70 mol % in a substantially homogenous liquid phase in the presence of a saponification catalyst in a reaction medium comprising a dialkyl sulfoxide solvent.

2. A process for producing ethylene-vinyl alcohol polymer according to claim 1, wherein said saponification is conducted while by-produced ester is being distilled off from the reaction zone.

3. A process according to claim 1, in which the ethylene content of the ethylene-vinyl ester copolymer ranges from about 1.0 to 70 mol %.

4. A process according to claim 1, in which the dialkyl sulfoxide solvent is dimethyl sulfoxide.

5. A process according to claim 3, in which the reaction medium further contains a monohydric alcohol having from 1 to 5 carbon atoms, wherein the alcohol is present in an amount of 1.0 to 50 molar equivalents based upon the theoretical mole calculated from the average molecular weight of the ethylene-vinyl ester copolymer and the dialkyl sulfoxide is present in an amount of about 1 to 70 wt % based upon the sum of the molecular weight of the ethylene-vinyl ester copolymer and the dialkyl sulfoxide.

* * * * *